(12) United States Patent
Liu et al.

(10) Patent No.: US 10,205,968 B2
(45) Date of Patent: Feb. 12, 2019

(54) METHOD AND APPARATUS FOR PALETTE INDEX CODING IN VIDEO AND IMAGE COMPRESSION

(71) Applicant: MEDIATEK INC., Hsin-Chu (TW)

(72) Inventors: Shan Liu, San Jose, CA (US); Xiaozhong Xu, State College, PA (US); Tzu-Der Chuang, Zhubei (TW); Yu-Chen Sun, Keelung (TW); Wang-Lin Lai, San Jose, CA (US); Yu-Wen Huang, Taipei (TW); Jing Ye, San Jose, CA (US)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/545,381

(22) PCT Filed: Feb. 3, 2016

(86) PCT No.: PCT/CN2016/073289
§ 371 (c)(1),
(2) Date: Jul. 21, 2017

(87) PCT Pub. No.: WO2016/127889
PCT Pub. Date: Aug. 18, 2016

(65) Prior Publication Data
US 2018/0091829 A1  Mar. 29, 2018

Related U.S. Application Data

(60) Provisional application No. 62/115,748, filed on Feb. 13, 2015, provisional application No. 62/116,704, (Continued)

(51) Int. Cl.
*H04N 19/93* (2014.01)
*H04N 19/593* (2014.01)
(Continued)

(52) U.S. Cl.
CPC ........... *H04N 19/93* (2014.11); *H04N 19/593* (2014.11); *H04N 19/70* (2014.11); *H04N 19/182* (2014.11)

(58) Field of Classification Search
CPC ....... H04N 19/93; H04N 19/70; H04N 19/593
See application file for complete search history.

(56) References Cited

U.S. PATENT DOCUMENTS 6,088,394 A * 7/2000 Maltby ................... G06T 9/004
375/240.12
9,729,875 B2 * 8/2017 Xu ........................ H04N 19/105
(Continued)

FOREIGN PATENT DOCUMENTS

CN      104301737 A    1/2015
WO  WO 2014/121206 A1   8/2014
(Continued)

OTHER PUBLICATIONS

International Search Report dated Apr. 28, 2016, issued in application No. PCT/CN2016/073289.
(Continued)

*Primary Examiner* — Tsion B Owens
(74) *Attorney, Agent, or Firm* — McClure, Qualey & Rodack, LLP

(57) ABSTRACT

A method of palette index map coding of blocks in a picture by grouping coded symbols of the same type is disclosed for video encoder and decoder. In one embodiment, all syntax elements corresponding to the pixel index are grouped into a pixel index group, and all syntax elements corresponding to the escape pixel are grouped into an escape pixel group. All syntax elements corresponding to the run type and run length are grouped into an interleaved run type/run length group, or grouped into separate run type group and run length group. In another embodiment, the system parses from the video bitstream a last-run mode syntax element for
(Continued)

a current block, where the last-run mode syntax element indicates whether a last run mode is a copy-index mode or a copy-above mode. Information associated with the last-run mode syntax element is used for reconstructing palette index map.

20 Claims, 8 Drawing Sheets

Related U.S. Application Data filed on Feb. 16, 2015, provisional application No. 62/133,644, filed on Mar. 16, 2015, provisional application No. 62/134,108, filed on Mar. 17, 2015, provisional application No. 62/218,751, filed on Sep. 15, 2015, provisional application No. 62/219,790, filed on Sep. 17, 2015, provisional application No. 62/243,208, filed on Oct. 19, 2015.

(51) Int. Cl.
*H04N 19/70* (2014.01)
*H04N 19/182* (2014.01)

(56) References Cited

U.S. PATENT DOCUMENTS

| | | | | |
|---|---|---|---|---|
| 2012/0314766 A1* | 12/2012 | Chien | ............... | H04N 19/176 |
| | | | | 375/240.12 |
| 2014/0185665 A1* | 7/2014 | Pu | ............... | H04N 19/117 |
| | | | | 375/240.02 |
| 2014/0301475 A1* | 10/2014 | Guo | ............... | H04N 19/50 |
| | | | | 375/240.24 |
| 2016/0100184 A1* | 4/2016 | Liu | ............... | H04N 19/50 |
| | | | | 382/166 |
| 2017/0318302 A1* | 11/2017 | Ye | ............... | H04N 19/119 |
| 2017/0332073 A1* | 11/2017 | Lin | ............... | H04N 19/186 |

FOREIGN PATENT DOCUMENTS

| | | |
|---|---|---|
| WO | WO 2014/165784 A1 | 10/2014 |
| WO | WO 2015/006169 A1 | 1/2015 |
| WO | 2016/074627 A1 | 5/2016 |
| WO | 2016/124158 A1 | 8/2016 |

OTHER PUBLICATIONS

Lai, P.L., et al.; "CE1: Summary report of CE on improvements of palette mode;" Joint Collaborative Team on Video Coding (JCT-VC) of ITU-T SG 16 WP 3 and ISO/IEC JTC 1/SC 29/WG 11; 20th Meeting: Geneva, CH; Feb. 2015; pp. 1-11.
Zhang, K. et al.; "CE1-related: Table based binarization for palette_escape_val;" Joint Collaborative Team on Video Coding (JCT-VC) of ITU-T SG 16 WP 3 and ISO/IEC JTC 1/SC 29/WG 11, 20th Meeting: Geneva, CH; Feb. 2015; pp. 1-3.
Karczewicz, M., et al.; "Non CE1 Grouping Palette Indices At Front;" Joint Collaborative Team on Video Coding (JCT-VC) of ITU-T SG 16 WP 3 and ISCO/IEC JTC 1/SC 29/WG 11; Feb. 2015; pp. 1-4.
Xu, X., et al.; "CE1-related escape pixel coding in palette mode;" Joint Collaborative Team on Video Coding (JCT-VC) of ITU-T SG 16 WP 3 and ISO/IEC JTC 1/SC 29/WG 11; Feb. 2015; pp. 1-10.

* cited by examiner

METHOD AND APPARATUS FOR PALETTE INDEX CODING IN VIDEO AND IMAGE COMPRESSION

CROSS REFERENCE TO RELATED APPLICATIONS

The present invention claims priority to U.S. Provisional Patent Application, Ser. 62/115,748, filed on Feb. 13, 2015, U.S. Provisional Patent Application, Ser. No. 62/116,704, filed on Feb. 16, 2015, U.S. Provisional Patent Application, Ser. No. 62/133,644, filed on Mar. 16, 2015, U.S. Provisional Patent Application, Ser. No. 62/134,108, filed on Mar. 17, 2015, U.S. Provisional Patent Application, Ser. No. 62/218,751, filed on Sep. 15, 2015, U.S. Provisional Patent Application, Ser. No. 62/219,790, filed on Sep. 17, 2015, and U.S. Provisional Patent Application, Ser. No. 62/243,208, filed on Oct. 19, 2015. The U.S. Provisional Patent Applications are hereby incorporated by reference in their entireties.

FIELD OF THE INVENTION

The present invention relates to palette index map coding for video data. In particular, the present invention relates to syntax signal/parsing for palette index map coding.

BACKGROUND AND RELATED ART

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition.

Along with the High Efficiency Video Coding (HEVC) standard development, the development of extensions of HEVC has also started. The HEVC extensions include screen content coding (SCC). Due to specific characteristics of screen contents, coding tools have been developed and demonstrate significant gains in coding efficiency. Among them, the color index coding (a.k.a. major color based coding) techniques represent block of pixels using indices to the palette (major colors), and encode the palette and the indices by exploiting spatial redundancy. While the total number of possible color combinations is huge, the number of colors in an area of picture is usually very limited for typical screen contents. Therefore, the color index coding becomes very effective for screen content materials. Related key color index coding techniques are briefly reviewed as follows.

Major-Color-Based Screen Content Coding

The major-color-based screen content coding is disclosed in JCTVC-O0108 (Guo, et al., "*RCE4: Test*1. *Major-color-based screen content coding*", Joint Collaborative Team on Video Coding (JCT-VC) of ITU-T SG 16 WP 3 and ISO/IEC JTC 1/SC 29/WG 11, 16th Meeting: San Jose, Calif., USA, Jan. 9-17, 2014, Document: JCTVC-P0108). Major-color-based screen content coding is performed on a CU basis. The encoding process is as follows:

Selecting Major Colors

A very simple but efficient histogram based algorithm is used to classify the pixels. In specific, the most significant L peak values in the histogram are selected as major colors, and the pixel values that are close to a major color will be quantized to the major color. Other pixels which do not belong to any major color sets are escape pixels, which will also be quantized before coding. For lossless coding, both of the quantization processes are not used. For each pixel, a color index is assigned to indicate which color set it belongs to. The color index may also be referred as an index for convenience when the term will not cause any confusion. If L major colors are used, the values of major colors 0 to (L−1) are signaled for the set of L major colors and the value of major color N is signaled for the escape pixel set.

Encoding the Color Index

After classification, the pixels of a block can be converted into color indices according to the major color set selected. A predictive coding method is applied to the indices, where a pixel line can be predicted by three different modes, including horizontal mode (i.e., copy index mode), vertical mode (i.e., copy above mode) and normal mode (i.e., escape mode).

Copy Index Mode

In copy index mode, starting from the first pixel, one or more consecutive indices are copied from the first pixel. The index of the first pixel is signaled.

Copy Above Mode

In this mode, one or more consecutive indices are copied from above pixel line.

Escape Mode

When an escape pixel is encountered (signaled by the largest index in major color set), its corresponding pixel value is coded right after the index. There may be more than 1 escape pixels and in different color values in the CU. For different escape pixel locations, the pixel values of escape pixels may be different.

Palette Mode Coding

A palette-based coding technique is disclosed in JCTVC-P0198 (Guo et al., "*RCE4: Results of Test* 2 *on Palette Mode for Screen Content Coding*", Joint Collaborative Team on Video Coding (JCT-VC) of ITU-T SG 16 WP 3 and ISO/IEC JTC 1/SC 29/WG 11, 16th Meeting: San Jose, Calif., USA, Jan. 9-17, 2014, Document: JCTVC-P0198). The palette-based coding is performed on a CU basis. The encoding process is as follows:

Transmission of the palette: the palette size is first transmitted followed by the palette elements. The maximum palette size is set to 24.

Transmission of pixel values: the pixels in the CU are encoded in a raster scan order. For each position, a flag is first transmitted to indicate whether the "run mode" (i.e., "copy-index mode" in this disclosure) or "copy-above mode" is being used.

"Run mode": In "run mode" (i.e., "copy-index mode" in this disclosure), a palette index is first signaled followed by "palette_run" (e.g., M). No further information needs to be transmitted for the current position and the following M positions as they have the same palette index as signaled. The palette index (e.g., i) is shared by all three color components, which means that the reconstructed pixel values are (Y, U, V)=(paletteY[i], paletteU[i], paletteV[i]) if the color space corresponds to YUV.

"Copy-above mode": In "copy-above mode", a value "copy_run" (e.g., N) is transmitted to indicate that for the following N positions (including the current one), the palette index is equal to the palette index of the one that is at the same location in the row above.

Transmission of residue: the palette indices transmitted are converted back to pixel values and used as the prediction. Residue information is transmitted using HEVC residue coding and is added to the prediction for the reconstruction.

Copy from Previous Row Above

Another index coding mode, called "copy from previous row", is disclosed in JCTVC-R0202 (Zou et al., "*Non-SCCE3: Copy from previous row mode for palette coding*", Joint Collaborative Team on Video Coding (JCT-VC) of ITU-T SG 16 WP 3 and ISO/IEC JTC 1/SC 29/WG 11, 18th Meeting: Sapporo, Japan, Jun. 30-Jul. 9, 2014, Document: JCTVC-R0202). This method enables to copy pixels from previously coded rows beyond the row above in the current CU. To achieve a better coding efficiency, all the previous coded rows are available as reference according to JCTVC-R0202. Accordingly, this mode is called "copy from previous row". This mode is added in the available palette mode candidate list. The row index information is coded when the current string chooses "copy from previous row" mode. The row index is coded using truncated binary codeword. Basically, a shorter codeword is designed for the row which is near to the current row. Similar to other modes, the matching length is coded in the bitstream.

In JCTVC-O0108 and JCTVC-P0198, similar palette based coding methods are disclosed. These references use slightly different terms for related parameters. The term "palette" in JCTVC-O0108 and the term "major color sets" in JCTVC-P0198 are referred as "major color table" in this disclosure. The term "palette index" in JCTVC-O0108 and the term "color index" in JCTVC-P0198 are referred as "color index" in this disclosure. The color indices related to the current coding unit are referred as "index map".

For a run of indices in the index map, there are several elements that need to be signaled, including:
 1) Run type: either it is a copy above run or a copy index run.
 2) Palette index: in a copy index run, it is used to signal what index is used for this run.
 3) Run length: the length of this run for both copy above and copy index type.
 4) Escape pixel: if there N (N>=1) escape pixels in the run, the N pixel values need to be signaled for these N escape pixels.

In JCTVC-T0065 (Karczewicz, et al., *Non CE1: Grouping Palette Indices At Front*, Joint Collaborative Team on Video Coding (JCT-VC) of ITU-T SG 16 WP 3 and ISO/IEC JTC 1/SC 29/WG 11, 20th Meeting: Geneva, CH, 10-18 Feb. 2015, Document: JCTVC-T0065), a syntax signaling is disclosed, where all the palette indices are grouped together. The number of palette indices is signaled first, following by the palette indices.

It is co-pending PCT Patent Application (Serial No. PCT/CN2015/094410, filed on Nov. 12, 2015), a syntax signaling method by grouping all the escape is disclosed by some common inventors of the current application.

The coding of palette index run type and run length in the HEVC Screen Content Coding specification (Joshi, et al., *High Efficiency Video Coding (HEVC) Screen Content Coding*: Draft 2, Joint Collaborative Team on Video Coding (JCT-VC) of ITU-T SG 16 WP 3 and ISO/IEC JTC 1/SC 29/WG 11, 19th Meeting: Strasbourg, FR, 17-24 Oct. 2014, Document: JCTVC-S1005) is as follows:

TABLE 1

| | Note |
|---|---|
| if( indexMax > 0 && scanPos > = nCbS && | |
|   palette_run_type_flag[ xcPrev ][ ycPrev ] | |
|   ! = COPY_ABOVE_MODE ) { | |
|     palette_run_type_flag[ xC ][ yC ] | (1-1) |
| } | |
| if( palette_run_type_flag[ xC ][ yC ] = = | |
|     COPY_INDEX_MODE && adjustedIndexMax > 0) | |
|   palette_index_idc | (1-2) |
| if( indexMax > 0 ) { | |
|   maxPaletteRun = nCbS * nCbS − scanPos − 1 | |
|   if( maxPaletteRun > 0 ) { | |
|     palette_run_msb_id_plus1 | (1-3) |
|     if( palette_run_msb_id_plus1 > 1 ) | |
|       palette_run_refinement_bits | (1-4) |
| } | |

As shown in Table 1, syntax elements for the palette run type (i.e., palette_run_type_flag[xC][yC]) and palette index (i.e., palette_index_idc) are incorporated for each occurrence as indicated by Notes (1-1) and (1-2). Two syntax elements palette_run_msb_id_plus1 and palette_run_refinement_bits are used to signal the run length corresponding to a MSB (most significant bit) part and refinement part respectively as indicated by Notes (1-3) and (1-4) in Table 1.

Palette Table Signaling

In the reference software of screen content coding (SCC) standard, SCM-2.0 (Joshi et al., *Screen content coding test model 2 (SCM 2)*, Joint Collaborative Team on Video Coding (JCT-VC) of ITU-T SG 16 WP 3 and ISO/IEC JTC 1/SC 29/WG 11, 18th Meeting: Sapporo, JP, July 2014, Document No.: JCTVC-R1014), an improved palette scheme is integrated in JCTVC-R0348 (Onno, et al., *Suggested combined software and text for run-based palette mode*, Joint Collaborative Team on Video Coding (JCT-VC) of ITU-T SG 16 WP 3 and ISO/IEC JTC 1/SC 29/WG 11, 18th Meeting: Sapporo, JP, July 2014, Document No.: JCTVC-R0348). The palette table of previous palette-coded CU is used as a predictor for current palette table coding. In palette table coding, the current palette table is signaled by choosing which palette colors in the previous coded palette table (palette predictor) are reused, or by transmitting new palette colors. The size of the current palette is set as the size of the predicted palette (i.e., numPredPreviousPalette) plus the size of the transmitted palette (i.e., num_signaled_palette_entries). The predicted palette is a palette derived from the previously reconstructed palette coded CUs. When coding the current CU as a palette mode, those palette colors that are not predicted using the predicted palette are directly transmitted in the bitstream (i.e., signaled entries).

An example of palette updating is shown as follows. In this example, the current CU is coded as palette mode with a palette size equal to six. Three of the six major colors are predicted from the palette predictor (numPredPreviousPalette=3) and three are directly transmitted through the bitstream. The transmitted three colors can be signaled using the exemplary syntax shown below.

num_signalled_palette_entries = 3
for( cIdx = 0; cIdx < 3; cIdx++ ) // signal colors for different components
  for( i = 0; i < num_signalled_palette_entries; i++ )
    palette_entries[ cIdx ][ numPredPreviousPalette +i ]

Since the palette size is six in this example, the palette indices from 0 to 5 are used to indicate the major color entries in the palette color table. The 3 predicted palette colors are represented with indices 0 to 2. Accordingly, three new palette entries are transmitted for indexes 3 through 5.

In SCM-2.0, if the wavefront parallel processing (WPP) is not applied, the palette predictor table is initialized (reset) at the beginning of each slice or at the beginning of each tile. If the WPP is applied, the last coded palette table is not only initialized (reset) at the beginning of each slice or at the beginning of each tile, but also initialized (reset) at the beginning of each CTU row.

In the HEVC SCC draft, a CU level flag "palette_escape_val_present_flag" is signaled when the palette size of the current Cs is greater than 0. If this flag is true, the use of escape pixels is enabled for this CU. One example of syntax table is shown in Table 2.

TABLE 2

| | Note |
|---|---|
| if( palette_escape_val_present_flag ) { | (2-1) |
|   sPos = 0 | |
|   while( sPos < nCbS * nCbS ) { | |
|     xC = x0 + travScan[ sPos ][ 0 ] | |
|     yC = y0 + travScan[ sPos ][ 1 ] | |
|     if( PaletteIndexMap[ xC ][ yC ] = = MaxPaletteIndex ) { | (2-2) |
|       for( cIdx = 0; cIdx < numComps; cIdx++ ) | |
|         if( cIdx = = 0 \|\| | |
|           ( xR % 2 = = 0 && yR % 2 = = 0 && | |
|           ChromaArrayType = = 1 ) \|\| | |
|           ( xR % 2 = = 0 && | |
|           ChromaArrayType = = 2 ) \|\| | |
|           ChromaArrayType = = 3 ) { | |
|           palette_escape_val | (2-3) |
|           PaletteEscapeVal[ cIdx ][ xC ][ yC ] = palette_escape_val | |
|         } | |
|     } | |
|     sPos++ | |
|   } | |
| } | |

In Table 2, if palette_escape_val_present_flag, as indicated by Note (2-1) is equal to 1, it indicates that at least one escape value exists for the CU. As mentioned before, the escape index corresponds to the largest palette index plus 1 (i.e., MaxPaletteIndex as indicated by Note (2-2)). In this case, the escape value is parsed from the bitstream as indicated by Note (2-3).

In palette coding, certainly relationship/restriction among various run modes can be utilized to improve coding efficiency. For example:

if the previous pixel is in a copy above run, then the current index should not be the same as its above pixel; and if the previous pixel is in a copy index run, then the current index should not be the same as its previous pixel.

Therefore, the number of possible index values can be reduced by 1. This technique is called "redundancy removal". The corresponding semantics is as follows. The variable PaletteIndexMap[xC][yC] specifies a palette index, which is an index to the array represented by CurrentPaletteEntries. The array indices xC and yC specify the location (xC, yC) of the sample relative to the top-left luma sample of the picture. The value of PaletteIndexMap[xC][yC] shall be in the range from 0 to MaxPaletteIndex, inclusive.

The variable adjustedRefPaletteIndex is derived as follows:

```
adjustedRefPaletteIndex = MaxPaletteIndex + 1
if( PaletteScanPos > 0 ) {
    if( palette_run_type_flag[xcPrev][ycPrev] !=
        COPY_ABOVE_MODE ) {
        xcPrev = xC + travScan[PaletteScanPos − 1][0]
        ycPrev = yC + travScan[PaletteScanPos − 1][1]
        adjustedRefPaletteIndex =
            PaletteIndexMap[xcPrev][ycPrev](7-79)
    }
    else
        adjustedRefPaletteIndex = PaletteIndexMap[xC][yC − 1]
```

When PaletteSampleMode[xC][yC] is not equal to COPY_ABOVE_MODE, the variable CurrPaletteIndex is derived as follows:

```
If MaxPaletteIndex is equal to 0
    CurrPaletteIndex = 0
Otherwizse,
    CurrPaletteIndex = PaletteIndexIdc[CurrNumIndices]
    if( CurrPaletteIndex >= adjustedRefPaletteIndex )
        CurrPaletteIndex + = 1
```

Palette Index Map Scan Order

In SCM-3.0 palette mode coding, the traverse scan is used for index map coding as shown in FIG. 1. FIG. 1 shows a traverse scan for an 8×8 block. In traverse scan, the scan for even rows is from left to right, and the scan for odd rows is from tight to left when the scanning order is horizontal. The traverse scan can also be applied in the vertical direction, where the scan is from top to bottom for even columns and from bottom to top for odd columns. The traverse scan is applied for all block sizes in palette mode.

SPS And PPS Syntax Related to Luma and Chroma Component

In the SPS (Sequence Parameter Set) and PPS (Picture Parameter Set) syntax tables for HEVC, there are some syntax elements related to luma and chroma components. However, for a monochrome video coding system, there are only one color component and these syntax elements related to the chroma component may have some redundancy. Some related syntax elements and their corresponding semantics are shown below.

SPS Related Syntax Elements and Semantics bit_depth_luma_minus8 specifies the bit depth of the samples of the luma array $BitDepth_Y$ and the value of the luma quantization parameter range offset $QpBdOffset_Y$ as follows:

$BitDepth_Y = 8 + bit\_depth\_luma\_minus8$, and $QpBdOffset_Y = 6 * bit\_depth\_luma\_minus8$, where bit_depth_luma_minus8 shall be in the range of 0 to 8, inclusive.

bit_depth_chroma_minus8 specifies the bit depth of the samples of the chroma arrays $BitDepth_C$ and the value of the chroma quantization parameter range offset $QpBdOffset_C$ as follows:

$BitDepth_C = 8 + bit\_depth\_chroma\_minus8$, and $QpBdOffset_C = 6 * bit\_depth\_chroma\_minus8$, where bit_depth_chroma_minus8 shall be in the range of 0 to 8, inclusive.

pcm_sample_bit_depth_luma_minus1 specifies the number of bits used to represent each of PCM sample values of the luma component as follows:

$PcmBitDepth_Y = pcm\_sample\_bit\_depth\_luma\_minus1 + 1$, where the value of PcmBitDepth$_Y$ shall be less than or equal to the value of BitDepth$_Y$.

pcm_sample_bit_depth_chroma_minus1 specifies the number of bits used to represent each of PCM sample values of the chroma components as follows:

PcmBitDepth$_C$=pcm_sample_bit_depth_chroma_minus1+1, where the value of PcmBitDepth$_C$ shall be less than or equal to the value of BitDepth$_C$. When ChromaArrayType is equal to 0, pcm_sample_bit_depth_chroma_minus1 is not used in the decoding process and decoders shall ignore its value.

PPS Related Syntax Elements and Semantics diff_cu_qp_delta_depth specifies the difference between the luma coding tree block size and the minimum luma coding block size of coding units that convey cu_qp_delta_abs and cu_qp_delta_sign_flag. The value of diff_cu_qp_delta_depth shall be in the range of 0 to log2_diff_max_min_luma_coding_block_size, inclusive. When not present, the value of diff_cu_qp_delta_depth is inferred to be equal to 0. The variable Log2MinCuQpDeltaSize is derived as follows:

Log2MinCuQpDeltaSize=CtbLog2Size$Y$−diff_cu_qp_delta_depth.

pps_cb_qp_offset and pps_cr_qp_offset specify the offsets to the luma quantization parameter Qp'$_Y$ used for deriving Qp'$_{Cb}$ and Qp'$_{Cr}$, respectively. The values of pps_cb_qp_offset and pps_cr_qp_offset shall be in the range of −12 to +12, inclusive. When ChromaArrayType is equal to 0, pps_cb_qp_offset and pps_cr_qp_offset are not used in the decoding process and decoders shall ignore their value.

pps_slice_chroma_qp_offsets_present_flag equal to 1 indicates that the slice_cb_qp_offset and slice_cr_qp_offset syntax elements are present in the associated slice headers. pps_slice_chroma_qp_offsets_present_flag equal to 0 indicates that these syntax elements are not present in the associated slice headers. When ChromaArrayType is equal to 0, pps_slice_chroma_qp_offsets_present_flag shall be equal to 0.

chroma_qp_offset_list_enabled_flag equal to 1 specifies that the cu_chroma_qp_offset_flag may be present in the transform unit syntax. chroma_qp_offset_list_enabled_flag equal to 0 specifies that the cu_chroma_qp_offset_flag is not present in the transform unit syntax. When ChromaArrayType is equal to 0, it is a requirement of bitstream conformance that the value of chroma_qp_offset_list_enabled_flag shall be equal to 0.

diff_cu_chroma_qp_offset_depth specifies the difference between the luma coding tree block size and the minimum luma coding block size of coding units that convey cu_chroma_qp_offset_flag. The value of diff_cu_chroma_qp_offset_depth shall be in the range of 0 to log2_diff_max_min_luma_coding_block_size, inclusive. The variable Log2MinCuChromaQpOffsetSize is derived as follows:

Log2MinCuChromaQpOffsetSize=CtbLog2Size$Y$−diff_cu_chroma_qp_offset_depth chroma_qp_offset_list_len_minus1 plus 1 specifies the number of cb_qp_offset_list[i] and cr_qp_offset_list[i] syntax elements that are present in the PPS. The value of chroma_qp_offset_list_len_minus1 shall be in the range of 0 to 5, inclusive.

cb_qp_offset_list[i] and cr_qp_offset_list[i] specify offsets used in the derivation of Qp'$_{Cb}$ and Qp'$_{Cr}$, respectively. The values of cb_qp_offset_list[i] and cr_qp_offset_list[i] shall be in the range of −12 to +12, inclusive.

It is desirable to improve the coding efficiency and/or syntax parsing throughput rate associated with palette index map coding.

BRIEF SUMMARY OF THE INVENTION

A method of palette index map coding of blocks in a picture by grouping coded symbols of the same type is disclosed for video encoder and decoder. In one embodiment, all syntax elements corresponding to the pixel index are grouped into a pixel index group, and all syntax elements corresponding to the escape pixel are grouped into an escape pixel group. All syntax elements corresponding to the run type and run length are grouped into an interleaved run type/run length group, or grouped into separate run type group and run length group.

When separate run type group and run length group are used, the signaling order of groups from an earliest group to a latest group in the video bitstream may correspond to the palette index group, the run type group, the run length group, and the escape pixel group. Also, various group ordering is used in various embodiments. In another embodiment, any context bin group is signal before any bypass coded group. In another embodiment, the run length group is further divided into a context bin group and a bypass coded group, and the context bin group is signaled before bypass coded group When the interleaved run type/run length group is used, the signaling order of groups from an earliest group to a latest group in the video bitstream may correspond to the palette index group, the interleaved run type/run length group, and the escape pixel group. Also, various group ordering is used in various embodiments. In another embodiment, any context bin group is signaled before any bypass coded group.

Another method of palette index map coding of blocks in a picture by signaling a last-run mode syntax element is disclosed for video encoder and decoder. Syntax elements corresponding to the copy-index mode and the copy-above mode are grouped into a run type group. A last-run mode syntax element to indicate whether a last run type mode is the copy-index mode or the copy-above mode is signaled. At the encoder side, if multiple same copy-index modes exist at an end of to-be-signaled palette indices, only one of the multiple same copy-index modes is signaled and the last-run mode syntax element is assigned a value to indicate the copy-index mode. If the last run type mode is the copy-above mode, the last-run mode syntax element is assigned a value to indicate the last run type mode being the copy-above mod and a last copy-above mode syntax element is omitted in a video bitstream for the current block. At the decoder side, the last-run mode syntax element for a current block is parsed from the video bitstream. If the last-run mode syntax element indicates the last run mode being the copy-index mode and when a last signaled palette index is reached, any remaining palette index to be decoded is copied from the last signaled palette index. If the last-run mode syntax element indicates the last run mode being the copy-above mode, one or more run lengths coded for the current block are parsed from the video bitstream and a copy-above mode syntax element is inserted as the last run mode The method of palette index coding by grouping coded symbols of the same type and the method of palette index map coding of blocks in a picture by signaling a last-run mode syntax element can be combined.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Palette Index Map Coding

As shown in Table 1, syntax elements for the palette run type and palette index are incorporated in the palette related syntax table for each occurrence. Also, two syntax elements palette_run_msb_id_plus1 and palette_run_refinement_bits are used to signal the run length. In order to improve the throughput of syntax parsing, a palette mode coding was proposed for consideration of SCM-4.0, where the palette indices are grouped and coded in the front (i.e., before palette_run_mode and palette_run coding) for a coding unit. Also, another method has been disclosed to group the escape pixels and code at the end for a coding unit. The palette_run_mode and palette_run are coded between palette indices and escape pixels.

In order to further improve the throughput of syntax parsing and/or to improve coding efficiency, a method of syntax grouping is disclosed in the present invention. In one embodiment, when all the N palette indices are grouped together to be written into bitstream, if there are multiple duplicated palette indices at the end of this series, only one of the duplicated palette indices is written.

Figure 1:
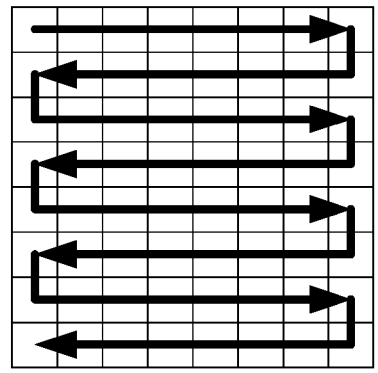
FIG. 1 illustrates an example of a horizontal traverse scan for an 8×8 block.
Figure 2:
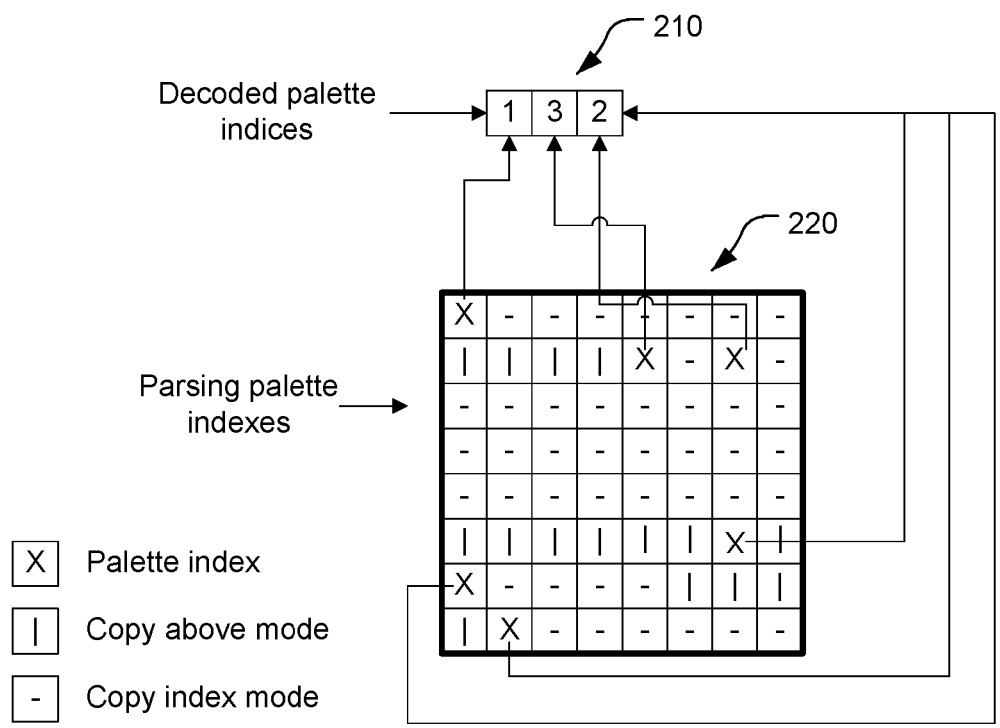
FIG. 2 illustrates an example of palette index map coding according to an embodiment of the present invention, where the number of palette indices N to be grouped is equal to 6.

FIG. 2 illustrates an example of palette index map coding according to an embodiment of the present invention with N=6. The values of these 6 palette indices to be coded are {1, 3, 2, 2, 2, 2}. In this example, horizontal raster scan is used. The last 4 palette indices are the same with a palette value equal to 2. Based on the conventional approach, all 6 palette indices have to be signaled. However, according to this embodiment, only the first palette index of those duplicated indices is signaled. Therefore, the total number of coded palette indices is reduced to 3. In other words, the decoded indices correspond to {1, 3, 2} as indicated by reference 210. At the decoder side, after parsing the palette indices and if the underlying palette run type is a copy index mode, the corresponding palette indices can be located in the decoded palette index table as indicated by reference 220. When the decoding process reaches the last entry of this table (i.e., index value 2), all the following palette indices for the copy index mode will be decoded as the last entry in the table.

Palette Syntax Coding

One aspect of the present invention addresses palette syntax coding to improve the processing efficiency such as improving the throughput rate of syntax parsing. As mentioned before, the syntax elements for each block (e.g., coding unit, CU) are signals. The syntax elements comprise palette index, run type, run length and escape pixel. According to one group of embodiments, the syntax elements for each block are grouped according to the syntax type.

As shown in FIG. 2, when palette index map coding is applied to a block (e.g., a coding unit), the pixels may be coded by run type modes including copy-index mode and copy above mode. As mentioned before, the run type modes (i.e., either the copy index mode or the copy above mode) for the current block need to be signaled. Each run mode has an associated run length that needs to be signaled. For the copy-index mode, the palate index also needs to be signal. However, for the copy-above mode, there is no need to signal the palette index. When a pixel has no corresponding value in the palette, the pixel is coded in the escape mode by signaling an escape index and a pixel value. In one embodiment of the present invention, all palette run types are grouped together and coded. In another embodiment of the present invention, all run lengths are grouped together and coded.

When all the run types, the palette indices, the run lengths, the escape pixels can be grouped into respected groups, examples of the order of their occurrences in the bitstream are shown as follows.

Example 1

The order of palette index map coding is: run type group→palette index group→run length group→escape pixel group Example 2

The order of palette index map coding is: run type group→run length group→palette index group→escape pixel group.

a. in the case that only palette indices and escape pixels are grouped separately, the order of palette index map coding is: interleaved (run type, run length)→palette index group→escape pixel group.

Example 3

The order of palette index map coding is: palette index group→run type group→run length group→escape pixel group.

Example 4

The order of palette index map coding is: palette index group→escape pixel group→run type group→run length group.
  a. If only group palette indices and escape pixels: palette index group→escape pixel group→interleaved (run_type, run_length group).

Example 5

The order of palette index map coding is: escape pixel group→palette index group→run type group→run length group.
  a. in the case that only palette indices and escape pixels are grouped separately, the order of palette index map coding is: escape pixel group→palette index group→interleaved (run type, run length)

Example 6

The order of palette index map coding is: number of copy_above_run or number of index_run→last_run_mode→run type group→palette index group→run length group→escape pixel group.
  a. Synatax element last_run_mode can be used to indicate whether the last run mode is copy_above_run or index_run. For example, when coding/decoding the run type group, if the encoded/decoded index_run number is equal to the number of index_run (i.e., copy index mode) and the last_run_mode is index_run, the run type group will be terminated. If the encoded/decoded index_run number is equal to the number of index_run and the last_run_mode is copy_above_run (i.e., the copy-above mode), the run type group will be also terminated and a syntax element copy_above_run is inserted at the end.
  b. Redundant index removal is not applied when previous coded run mode is copy_above_run. Therefore, when the previous coded run is copy_above_run, the maximum index number will not decreased by 1, and the actual index is signaled.

Example 7

The order of palette index map coding is: number of copy_above_run or number of index_run→run type group→last_run_mode→palette index group→run length group→escape pixel group.
  a. The last_run_mode indicates the last run mode is copy_above_run or index_run. For example, when coding/decoding run type group, if the encoded/decoded index run number equal to the number of index_run, a last_run_mode indicating the index_run is signaled/parsed. If the last run mode is copy_above_run, the last_run_mode indicating the copy_above_run is signaled and a copy_above_run is omitted/inserted at the end.
  b. The redundant index removal is not applied when previous coded run mode is copy_above_run. Therefore, when previous coded run is copy_above_run the maximum index number will not decreased by 1, and the actual index is signaled.

Note that when all run types are grouped before the run lengths, the exact position of the run cannot be determined when parsing the run types (except for the first run). Thus the condition of "not signaling run type for positions in the first line" needs to be removed.

Additional examples of palette index coding are disclosed as follow:

Example 8

The order of palette index map coding is: number of palette indices→palette index group→last_run_type→run type group→run length group→escape pixel group. One example of syntax table for this embodiment is shown in Table 3. In Table 3, the number of palette indices is signaled as indicated by Note (3-1). The palette index group is signaled by syntax lines from Note (3-2a) through Note (3-2b). The last_run_type (i.e., last_palette_run_type_flag) is signaled as indicated by Note (3-3). The run type group is signaled by syntax lines from Note (3-4a) through Note (3-4b). The run length group is signaled by syntax lines from Note (3-5a) through Note (3-5b). The escape pixel group is signaled by syntax lines from Note (3-6a) through Note (3-6b).
  a. Since the palette run group is decoded before the palette run group, for the palette run signaling, the maximum possible run can be further subtracted by number of rest run modes. For example, maxPaletteRun=nCbS*nCbS−scanPos−1−number of rest run modes.

TABLE 3

| | Note |
|---|---|
| if( MaxPaletteIndex > 0) { | |
|   palette_transpose_flag | |
|   num_palette_indices_idc | (3-1) |
| NumPaletteIndices = num_palette_indices_idc | |
|   for( i=0; i < NumPaletteIndices; i++ ) | (3-2a) |
|   { | |
|     palette_index_idc | |
|     PaletteIndexIdc[ i ] = palette_index_idc | |
|   } | (3-2b) |
|   last_palette_run_type_flag | (3-3) |
|   NumPaletteRunType = NumPaletteIndices − 1 | |
|   RunTypeIdx = 0 | |

TABLE 3-continued

|  | Note |
|---|---|
| ```
        While( NumPaletteRunType )
        {
            palette_run_type_flag
            PaletteRunType [ RunTypeIdx ] = palette_run_type_flag
            ...
            RunTypeIdx++
        }
    }
    ...
    while( PaletteScanPos < nCbS * nCbS ) {
        ......
        if( MaxPaletteIndex > 0 && CurrNumIndices < NumPaletteIndices ) {
            if( PaletteScanPos > 0 && PaletteRunTypeFlag [ xcPrev ][ ycPrev ]
                != COPY_ABOVE_MODE && PaletteScanPos < nCbS * nCbS - 1) {
                PaletteRunTypeFlag[ xC ][ yC ] = PaletteRunType [ CurrNumRunTypes++ ]
            }
            readIndex = 0
            if(PaletteRunTypeFlag[ xC ][ yC ] = = COPY_INDEX_MODE &&
                AdjustedMaxPaletteIndex > 0)
                readIndex = 1
            maxPaletteRun = nCbS * nCbS - PaletteScanPos - ( RunTypeIdx -
                                                CurrNumRunTypes ) -1
            if( AdjustedMaxPaletteIndex > 0 &&
                ( ( CurrNumIndices + readIndex ) < NumPaletteIndices | |
                PaletteRunTypeFlag[ xC ][ yC ] != ( RunTypeIdx - CurrNumRunTypes ) > 0 )
                if( maxPaletteRun > 0 ) {
                    palette_run_msb_id_plus1
                    if( palette_run_msb_id_plus1 > 1 )
                        palette_run_refinement_bits
                }
                 else
                    PaletteRun = nCbS * nCbS - PaletteScanPos -
                                ( RunTypeIdx - CurrNumRunTypes ) - 1
            CurrNumIndices + = readIndex
        }
        runPos = 0
        while ( runPos < = paletteRun ) {
            xR = x0 + travScan[ PaletteScanPos ][ 0 ]
            yR = y0 + travScan[ PaletteScanPos ][ 1 ]
            if(PaletteRunTypeFlag [ xC ][ yC ] = = COPY_INDEX_MODE ) {
                PaletteSampleMode[ xR ][ yR ] = COPY_INDEX_MODE
                PaletteIndexMap[ xR ][ yR ] = CurrPaletteIndex
            } else {
                PaletteSampleMode[ xR ][ yR ] = COPY_ABOVE_MODE
                PaletteIndexMap[ xR ][ yR ] = PaletteIndexMap[ xR ] [ yR - 1 ]
            }
            runPos++
            PaletteScanPos++
        }
    }
}
if( palette_escape_val_present_flag ) {
    ...
        for( cIdx = 0; cIdx < numComps; cIdx++ )
            ...
                palette_escape_val
                PaletteEscapeVal[ cIdx ][ xC ][ yC ] = palette_escape_val
            }
        ...
    }
}
``` | (3-4a)<br>(3-4b)<br><br>(3-5a)<br><br><br><br><br><br><br><br><br><br><br><br><br><br><br><br><br><br><br><br><br><br>(3-5b)<br><br><br><br><br><br><br><br><br><br><br><br><br><br>(3-6a)<br><br><br><br><br><br><br><br>(3-6b) |

Example 9

The order of palette index map coding is: number of palette indices→palette index group→last_run_type→run type group→context coded bin(s) of run length group→bypass coded bin(s) of run length group→escape pixel group. One example of syntax table for this embodiment is shown in Table 4. In Table 4, the number of palette indices is signaled as indicated by Note (4-1). The palette index group is signaled by syntax lines from Note (4-2a) through Note (4-2b). The last_run_type (i.e., last_palette_run_type_flag) is signaled as indicated by Note (4-3). The run type group is signaled by syntax lines from Note (4-4a) through Note (4-4b). The context coded bin(s) of run length group is signaled by syntax lines from Note (4-5a) through Note (4-5b). The bypass coded bin(s) of run length group is signaled by syntax lines from Note (4-6a) through Note (4-6b). The escape pixel group is signaled by syntax lines from Note (4-7a) through Note (4-7b).

a. Since the palette run group is decoded before palette run group, for the palette run signaling, the maximum possible run can be further subtracted by number of rest run modes. For example, maxPaletteRun=nCbS*nCbS−scanPos−1−number of rest run modes.

TABLE 4

| | Note |
|---|---|
| if( MaxPaletteIndex > 0 ) { | |
|     palette_transpose_flag | |
|     num_palette_indices_idc | (4-1) |
| NumPaletteIndices = num_palette_indices_idc | |
|     for( i=0; i < NumPaletteIndices; i++ ) | (4-2a) |
|     { | |
|         palette_index_idc | |
|         PaletteIndexIdc[ i ] = palette_index_idc | |
|     } | (4-2b) |
|     last_palette_run_type_flag | (4-3) |
| NumPaletteRunType = NumPaletteIndices − 1 | |
| RunTypeIdx = 0 | |
|     While( NumPaletteRunType ) | (4-4a) |
|     { | |
|         palette_run_type_flag | |
|         PaletteRunType [ RunTypeIdx ] = palette_run_type_flag | |
|  if ( PaletteRunType [ RunTypeIdx ] == COPY_INDEX_MODE) | |
|         NumPaletteRunType − = 1 | |
|     RunTypeIdx++ | |
|     } | (4-4b) |
|     NumRunLengths = RunTypeIdx − 1 | |
|     for( i=0; i < NumRunLengths ; i++ ) | (4-5a) |
|     { | |
|         palette_run_msb_id_plus1 | |
|         PaletteRunMsbIdPlus1[ i ] = palette_run_msb_id_plus1 | |
|     } | (4-5b) |
| } | |
| CurrNumIndices = 0 | |
| CurrNumRunTypes = 0 | |
| CurrNumRunLengths = 0 | |
| PaletteScanPos = 0 | |
| while( PaletteScanPos < nCbS * nCbS ) { | |
|     ...... | |
|     if( MaxPaletteIndex > 0 && CurrNumIndices < NumPaletteIndices ) { | |
|         if( PaletteScanPos > 0 && PaletteRunTypeFlag [ xcPrev ][ ycPrev ] | |
|         != COPY_ABOVE_MODE && PaletteScanPos < nCbS * nCbS − 1) { | |
|             PaletteRunTypeFlag[ xC ][ yC ] = | |
|                 PaletteRunType [ CurrNumRunTypes ++] | |
|         } | |
|         readIndex = 0 | |
|         if(PaletteRunTypeFlag[ xC ][ yC ] = = | |
|          COPY_INDEX_MODE && AdjustedMaxPaletteIndex > 0) | |
|             readIndex = 1 | |
|         maxPaletteRun = nCbS * nCbS − PaletteScanPos − | |
|                 ( RunTypeIdx − CurrNumRunTypes ) − 1 | |
|         if( AdjustedMaxPaletteIndex > 0 && | |
|           ( ( CurrNumIndices + readIndex ) < NumPaletteIndices | | | |
|           PaletteRunTypeFlag[ xC ][ yC ] != | |
| last_palette_run_type_flag ) && ( RunTypeIdx − CurrNumRunTypes ) > 0) | |
|             if ( maxPaletteRun > 0 ) { | (4-6a) |
|                 if( PaletteRunMsbIdPlus1[ CurrNumRunLengths ++ ] > 1 ) | |
|                   palette_run_refinement_bits | |
|             } | |
|             else | |
|                 PaletteRun = nCbS * nCbS − PaletteScanPos − | |
|                       ( RunTypeIdx − CurrNumRunTypes ) − 1 | |
|         CurrNumIndices + = readIndex | |
|     } | (4-6b) |
|     ..... | |
|     runPos++ | |
|     PaletteScanPos++ | |
|     } | |
| } | |
| if( palette_escape_val_present_flag ) { | (4-7a) |
|     ... | |
|         for( cIdx = 0; cIdx < numComps; cIdx++ ) | |
|             ... | |
|             palette_escape_val | |
|             PaletteEscapeVal[ cIdx ][ xC ][ yC ] = palette_escape_val | |
|         } | (4-7b) |
|     ... | |
|     } | |
| } | |

Example 10

The order of palette index map coding is: number of run types→run type group→run length group→palette index group→escape pixel group. One example of syntax table for this embodiment is shown in Table 5a. Syntax element for number of run types (i.e., num_palette_run_type_flag) is signaled as indicated by Note (5a-1). The run type group is signaled as shown by syntax lines from Note (5a-2a) to Note (5a-2b). The run length group is signaled as shown by syntax lines from Note (5a-3a) to Note (5a-3b). The palette index group is signaled as shown by syntax lines from Note (5a-4a) to Note (5a-4b). The escape pixel group is signaled as shown by syntax lines from Note (5a-5a) to Note (5a-5b).

In Table 5a, syntax element NumPaletteRunType is a variable derived by num_palette_run_type_flag. The syntax element corresponds to the number of run types signaled in the current CU. Syntax element CurrPaletteIndex is a variable derived from PaletteIndexIdc array. It means the the palette index for the current location.

TABLE 5a

|  | Note |
|---|---|
| ```
if( MaxPaletteIndex > 0 ) {
    palette_transpose_flag
    num_palette_run_type_flag
    RunTypeIdx = 0
    NumPaletteIndices = 0
    for( i=0 ; i < NumPaletteRunType ; i++ )
    {
        palette_run_type_flag
        PaletteRunType [ i ] = palette_run_type_flag
        if ( PaletteRunType [ i ] = = COPY_INDEX_MODE )
            NumPaletteIndices++
    }
CurrNumIndices = 0
CurrNumRunTypes = 0
PaletteScanPos = 0
while( PaletteScanPos < nCbS * nCbS ) {
    ......
    if( MaxPaletteIndex > 0 && CurrNumIndices < NumPaletteIndices ) {
        if( PaletteScanPos > 0 && PaletteRunTypeFlag [ xcPrev ][ ycPrev ]
                != COPY_ABOVE_MODE && PaletteScanPos < nCbS * nCbS - 1 ) {
            PaletteRunTypeFlag[ xC ][ yC ] =
                            PaletteRunType [ CurrNumRunTypes++ ]
        }
        readIndex = 0
    if(PaletteRunTypeFlag[ xC ][ yC ] = =
                    COPY_INDEX_MODE && AdjustedMaxPaletteIndex > 0)
            readIndex = 1
    maxPaletteRun = nCbS * nCbS - PaletteScanPos -
                    ( NumPaletteRunType - CurrNumRunTypes ) - 1
    if( AdjustedMaxPaletteIndex > 0 &&
        ( ( CurrNumIndices + readIndex ) < NumPaletteIndices | |
        PaletteRunTypeFlag[ xC ][ yC ] !=
        last_palette_run_type_flag ) && ( RunTypeIdx - CurrNumRunTypes ) > 0 )
            if( maxPaletteRun > 0 ) {
                palette_run_msb_id_plus1
                if( palette_run_msb_id_plus1 > 1 )
                    palette_run_refinement_bits
            }
        else
            PaletteRun = nCbS * nCbS - PaletteScanPos -
                            (NumPaletteRunType- CurrNumRunTypes ) - 1
        CurrNumIndices + = readIndex
    }
    PaletteScanPos += paletteRun + 1
}
for( i=0; i < NumPaletteIndices; i++ )
{
    palette_index_idc
    PaletteIndexIdc[ i ] = palette_index_idc
}
CurrNumIndices = 0
PaletteScanPos = 0
while( PaletteScanPos < nCbS * nCbS ) {
    runPos = 0
    xC = x0 + travScan[ PaletteScanPos ][ 0 ]
    yC = y0 + travScan[ PaletteScanPos ][ 1 ]
    while ( runPos < = paletteRun ) {
        xR = x0 + travScan[ PaletteScanPos ][ 0 ]
        yR = y0 + travScan[ PaletteScanPos ][ 1 ]
``` | (5a-1)<br><br><br>(5a-2a)<br><br><br><br><br>(5a-2b)<br><br><br><br><br><br><br><br><br><br><br><br><br><br><br><br><br><br>(5a-3a)<br><br><br>(5a-3b)<br><br><br><br><br><br>(5a-4a)<br><br><br>(5a-4b) |

TABLE 5a-continued

|  | Note |
|---|---|
| ```
            if(PaletteRunTypeFlag [ xC ][ yC ] = = COPY_INDEX_MODE ) {
                PaletteSampleMode[ xR ][ yR ] = COPY_INDEX_MODE
                PaletteIndexMap[ xR ][ yR ] = CurrPaletteIndex
            } else {
                PaletteSampleMode[ xR ][ yR ] = COPY_ABOVE_MODE
                PaletteIndexMap[ xR ][ yR ] = PaletteIndexMap[ xR ][ yR − 1 ]
            }
            runPos++
            PaletteScanPos++
        }
    }
    if( palette_escape_val_present_flag ) {
        ...
            for( cIdx = 0; cIdx < numComps; cIdx++ )
                ...
                    palette_escape_val
                    PaletteEscapeVal[ cIdx ][ xC ][ yC ] = palette_escape_val
            }
        ...
    }
}
``` | (5a-5a)<br><br><br><br>(5a-5b) |

A variation of Example 10 is disclosed, where the number of run types can be replaced by the combination of number of palette indices and the last_run_type flag. One example of syntax table for this embodiment is shown in Table 5b. As shown in Table 5b, the syntax element for number of palette indices (i.e., num_palette_indices_idc) and the syntax element for last_run_type flag (i.e., last_palette_run_type_flag) as indicated by Notes (5b-1) and (5b-2) respectively.

TABLE 5b

|  | Note |
|---|---|
| ```
if( MaxPaletteIndex > 0 ) {
    palette_transpose_flag
    num_palette_indices_idc
    last_palette_run_type_flag
    RunTypeIdx = 0
    NumRunTypeCount = NumPaletteIndices
    while( NumRunTypeCount )
    {
        palette_run_type_flag
        PaletteRunType [ RunTypeIdx ] = palette_run_type_flag
        if ( PaletteRunType [ RunTypeIdx ] = = COPY_INDEX_MODE )
            NumRunTypeCount−−
        RunTypeIdx++
    }
}
CurrNumIndices = 0
.../* the rest is the same as in Table 5a*/
``` | <br><br>(5b-1)<br>(5b-2) |

Another variation of Example 10 is disclosed, where the number of run types can be replaced by the combination of number of copy above run and the last_run_type flag. One example of syntax table for this embodiment is shown in Table 5c. As shown in Table 5c, the syntax element for number of copy above run (i.e., num_copy_above_run) and the syntax element for last_run_type flag (i.e., last_palette_run_type_flag) as indicated by Notes (5c-1) and (5c-2) respectively.

TABLE 5c

|  | Note |
|---|---|
| ```
if( MaxPaletteIndex > 0 ) {
    palette_transpose_flag
    num_copy_above_run
    last_palette_run_type_flag
    RunTypeIdx = 0
    while( NumCopyAboveRun )
``` | <br><br>(5c-1)<br>(5c-2) |

TABLE 5c-continued

| | Note |
|---|---|
| ```
       {
           palette_run_type_flag
           PaletteRunType [ RunTypeIdx ] = palette_run_type_flag
           if ( PaletteRunType [ RunTypeIdx ] = = COPY_ABOVE_MODE )
               NumCopyAboveRun--
           RunTypeIdx++
       }
   }
   CurrNumIndices = 0
.../* the rest is the same as in Table 5a*/
``` | |

Yet another variation of Example 10 is disclosed, where the number of run types can be replaced by the combination of number of copy index run and the last_run_type flag. One example of syntax table for this embodiment is shown in Table 5d. As shown in Table 5d, the syntax element for number of copy index run (i.e., num_copy_index_run) and the syntax element for last_run_type flag (i.e., last_palette_run_type_flag) as indicated by Notes (5d-1) and (5d-2) respectively. NumCopyIndexRun is the number of copy index run. It is a variable derived from num_copy_index_run.

TABLE 5d

| | Note |
|---|---|
| ```
if( MaxPaletteIndex > 0) {
    palette_transpose_flag
    num_copy_index_run
    last_palette_run_type_flag
    RunTypeIdx = 0
    while( NumCopyIndexRun )
    {
        palette_run_type_flag
        PaletteRunType [ RunTypeIdx ] = palette_run_type_flag
        if ( PaletteRunType [ RunTypeIdx ] = = COPY_INDEX_MODE )
            NumCopyIndexRun--
        RunTypeIdx++
    }
}
CurrNumIndices = 0
.../* the rest is the same as in Table 5a*/
``` | (5d-1)<br>(5d-2) |

Another variation of Example 10 is to signal interleaved run type group and context coded bins of run length: (run type+run length) group→palette index group→escape pixel group.

Example 11

The order of palette index map coding is: number of run types→run type group→context coded bin(s) of run length group→bypass coded bin(s) of run length group→palette index group→escape pixel group. One example of syntax table for this embodiment is shown in Table 6. In Table 6, the number of run types is signaled as indicated by Note (6-1). The run type group is signaled by syntax lines as indicated by Note (6-2a) through syntax line indicated by Note (6-2b). The context coded bin(s) of run length group is signaled by syntax lines from as indicated by Note (6-3a) through (6-3b). The bypass coded bin(s) of run length group is signaled by syntax lines from as indicated by Note (6-4a) through (6-4b). The palette index group is signaled by syntax lines from Note (6-5a) through Note (6-5b). The escape pixel group is signaled by syntax lines from Note (6-6a) through Note (6-6b).

TABLE 6

| | Note |
|---|---|
| ```
if( MaxPaletteIndex > 0) {
    palette_transpose_flag
    num_palette_run_type_flag
    last_palette_run_type_flag
    RunTypeIdx = 0
    NumPaletteIndices = 0
    for( i=0 ; i < NumPaletteRunType ; i++ )
``` | (6-1) |

TABLE 6-continued

| | Note |
|---|---|
| ``` | |
| {                                                                    | (6-2a) |
|     palette_run_type_flag                                            | |
|     PaletteRunType [ RunTypeIdx ] = palette_run_type_flag            | |
|     if ( PaletteRunType [ RunTypeIdx ] = = COPY_INDEX_MODE )         | |
|         NumPaletteIndices++                                          | |
|     RunTypeIdx++                                                     | |
| }                                                                    | (6-2b) |
| NumRunLengths = RunTypeIdx − 1                                       | |
| for( i=0; i < NumRunLengths ; i++ )                                  | (6-3a) |
| {                                                                    | |
|     palette_run_msb_id_plus1                                         | |
|     PaletteRunMsbIdPlus1[ i ] = palette_run_msb_id_plus1             | |
| }                                                                    | (6-3b) |
| for( i=0; i < NumRunLengths ; i++ )                                  | (6-4a) |
| {                                                                    | |
|     if( PaletteRunMsbIdPlus1[ i ] > 1)                               | |
|         palette_run_refinement_bits                                  | |
| }                                                                    | (6-4b) |
| for( i=0; i < NumPaletteIndices; i++ )                               | (6-5a) |
| {                                                                    | |
|     palette_index_idc                                                | |
|     PaletteIndexIdc[ i ] = palette_index_idc                         | |
| }                                                                    | (6-5b) |
| ``` | |

```
}
CurrNumIndices = 0
CurrNumRunTypes = 0
PaletteScanPos = 0
while( PaletteScanPos < nCbS * nCbS ) {
    ......
    if( MaxPaletteIndex > 0 && CurrNumIndices < NumPaletteIndices ) {
        if( PaletteScanPos >= nCbS && palette_run_type_flag[ xcPrev ][ ycPrev ]
            != COPY_ABOVE_MODE && PaletteScanPos < nCbS * nCbS − 1) {
          PaletteRunTypeFlag[ xC ][ yC ] = PaletteRunType [ CurrNumRunTypes ]
        }
        readIndex = 0
        if(PaletteRunTypeFlag[ xC ][ yC ] = =
            COPY_INDEX_MODE && AdjustedMaxPaletteIndex > 0)
            readIndex = 1
        maxPaletteRun = nCbS * nCbS − PaletteScanPos − 1
        if( AdjustedMaxPaletteIndex > 0 &&
            ( ( CurrNumIndices + readIndex ) < NumPaletteIndices | |
            PaletteRunTypeFlag[ xC ][ yC ] != last_palette_run_type_flag ) )
        CurrNumIndices + = readIndex
        CurrNumRunTypes + = 1
    }
    runPos = 0
    while ( runPos < = paletteRun ) {
        xR = x0 + travScan[ PaletteScanPos ][ 0 ]
        yR = y0 + travScan[ PaletteScanPos ][ 1 ]
        if(palette_run_type_flag [ xC ][ yC ] = = COPY_INDEX_MODE ) {
            PaletteSampleMode[ xR ][ yR ] = COPY_INDEX_MODE
            PaletteIndexMap[ xR ][ yR ] = CurrPaletteIndex
        } else {
            PaletteSampleMode[ xR ][ yR ] = COPY_ABOVE_MODE
            PaletteIndexMap[ xR ][ yR ] = PaletteIndexMap[ xR ][ yR − 1 ]
        }
        runPos++
        PaletteScanPos++
    }
}
```

| | Note |
|---|---|
| ``` | |
| if( palette_escape_val_present_flag ) {                              | (6-6a) |
|     ...                                                              | |
|             for( cIdx = 0; cIdx < numComps; cIdx++ )                 | |
|                 ...                                                  | |
|                     palette_escape_val                               | |
|                     PaletteEscapeVal[ cIdx ][ xC ][ yC ] = palette_escape_val | |
|                 }                                                    | (6-6b) |
|     ...                                                              | |
| }                                                                    | |
| }                                                                    | |
| ``` | |

Several variations of Example 11 are also disclosed as follows:

a. Number of run types can be replaced by the combination of number of palette indices and the last_run_type flag.

(7a-2b). The last_run_type is signaled as indicated by Note (7a-3). The syntax element related to the number of escape pixels (i.e., num_escape_val_minus1) is signaled as indicated by Note (7a-4). The escape pixel group is signaled by syntax lines from Note (7a-5a) through Note (7a-5b).

TABLE 7a

|  | Note |
|---|---|
| if( MaxPaletteIndex > 0 ) { | |
|   palette_transpose_flag | |
|   num_palette_indices_idc | (7a-1) |
|   for( i=0; i < NumPaletteIndices; i++ ) | (7a-2a) |
|   { | |
|     palette_index_idc | |
|     PaletteIndexIdc[ i ] = palette_index_idc | |
|   } | (7a-2b) |
|   last_palette_run_type_flag | (7a-3) |
|   if(currentPaletteSize != 0 && palette_escape_val_present_flag ) { | |
|     num_escape_val_minus1 | (7a-4) |
|     for( i = 0; i <= num_escape_val_minus1; i++ ) | (7a-5a) |
|       for( cIdx = 0; cIdx < numComps; cIdx++ ) { | |
|         if( cIdx = = 0 \|\| | |
|           ( xR % 2 = = 0 && yR % 2 = = 0 && ChromaArrayType = = 1 ) \|\| | |
|           ( xR % 2 = = 0 && ChromaArrayType = = 2 ) \|\| | |
|           ChromaArrayType = = 3 ) { | |
|         palette_escape_val | |
|         PaletteEscapeValTemp[ i ][ cIdx ] = palette_escape_val | |
|       } | (7a-5b) |
|     } | |
|   } | |
| } | |
| ... | |
| if( palette_escape_val_present_flag ) { | |
|   sEscapeIdx = 0 | |
|   sPos = 0 | |
|   while( sPos < nCbS * nCbS ) { | |
|     xC = x0 + travScan[ sPos ][ 0 ] | |
|     yC = y0 + travScan[ sPos ][ 1 ] | |
|     if( PaletteIndexMap[ xC ][ yC ] = = MaxPaletteIndex ) { | |
|       for( cIdx = 0; cIdx < numComps; cIdx++ ) | |
|         PaletteEscapeVal[ cIdx ][ xC ][ yC ] = | |
|           PaletteEscapeValTemp[ sEscapeIdx++ ][ cIdx ] | |
|     } | |
|     sPos++ | |
|   } | |
| } | | b. Number of run types can be replaced by the combination of number of copy above run and the last_run_type flag.

c. Number of run types can be replaced by the combination of number of copy index run and the last_run_type flag.

d. Another variation is to signal interleaved run type group and context coded bins of run length: i.e., number of run types→(run type+context coded bin(s) of run length) group→bypass coded bin(s) of run length group→palette index group→escape pixel group.

e. If decoded value of context coded bins of run length for a certain pixel is smaller than the default value such as 1, bypass coded bin of run length for the pixel can be skipped.

Example 12

The order of palette index map coding is: number of palette indices→palette index group→last_run_type→number of escape pixels→escape pixel group→run type group→run length group. One example of syntax table for this embodiment is shown in Table 7a. In Table 7a, the number of palette indices is signaled as indicated by Note (7a-1). The palette index group is signaled by syntax lines as indicated by Note (7a-2a) through syntax line indicated by Note Several variations of Example 12 are also disclosed as follows:

a. The combination of number of palette indices and last_run_type flag can be replaced by the number of run type.

b. The combination of number of palette indices and last_run_type flag can be replaced by the combination of number of copy above run and the last_run_type flag.

c. The combination of number of palette indices and last_run_type flag can be replaced by the combination of number of copy index run and the last_run_type flag.

d. Since palette index group is coded before the number of escape pixels, the number of escape pixels coded in the index mode with run equal to 0 is known. Therefore, only the number of escape pixels, which are coded in the index mode with run larger than 0 and from copy above mode, needs to be signaled. One example of syntax table for this embodiment is shown in Table 7b, where the index group is coded ahead of the number of escape pixels. Therefore, by parsing the index group, the number of escape pixels (i.e., index with largest value) at the first location to start an index run is known. This information is helpful to reduce the actual signaled number of escape pixels in the CU.

TABLE 7b

| | Note |
|---|---|
| ```
if( MaxPaletteIndex > 0 ) {
    palette_transpose_flag
    num_palette_indices_idc
    numEscapePixels = 0
    for( i=0; i < NumPaletteIndices; i++ )
    {
        palette_index_idc
        PaletteIndexIdc[ i ] = palette_index_idc
        if(palette_index_idc == MaxPaletteIndex) numEscapePixels++
    }
    last_palette_run_type_flag
    if(currentPaletteSize != 0 && palette_escape_val_present_flag ) {
        num_extra_escape_val
        numEscapePixels += num_extra_escape_val
        ....
    }
    }
}
...
if( palette_escape_val_present_flag ) {
    sEscapeIdx = 0
    sPos = 0
    while( sPos < nCbS * nCbS ) {
        xC = x0 + travScan[ sPos ][ 0 ]
        yC = y0 + travScan[ sPos ][ 1 ]
        if( PaletteIndexMap[ xC ][ yC ] = = MaxPaletteIndex ) {
            for( cIdx = 0; cIdx < numComps; cIdx++ )
                PaletteEscapeVal[ cIdx ][ xC ][ yC ] =
                    PaletteEscapeValTemp[ sEscapeIdx++ ][ cIdx ]
            }
        }
        sPos++
    }
}
``` | |

Example 13

The order of palette index map coding is: number of palette indices→last_run_type→palette index group→number of escape pixels→escape pixel group→run type group→context coded bin(s) of run length group→bypass coded bin(s) of run length group. One example of syntax table for this embodiment is shown in Table 8. In Table 8, the number of palette indices is signaled as indicated by Note (8-1). The last run type is signal as indicated by Note (8-2). The palette index group is signaled by syntax lines from Note (8-3a) through Note (8-3b). The number of escape pixels is signaled as indicated by Note (8-4). The escape pixel group is signaled by syntax lines from Note (8-5a) through Note (8-5b). The run type group is signaled by syntax lines as indicated by Note (8-6a) through syntax line indicated by Note (8-6b). The context coded bin(s) of run length group is signaled by syntax lines from as indicated by Note (8-7a) through (8-7b). The bypass coded bin(s) of run length group is signaled by syntax lines from as indicated by Note (8-8a) through (8-8b).

TABLE 8

| | Note |
|---|---|
| ```
if( MaxPaletteIndex > 0 ) {
    palette_transpose_flag
    num_palette_indices_idc
``` | |
| | (8-1) |
| ```
    last_palette_run_type_flag
``` | (8-2) |
| ```
    for( i=0; i < NumPaletteIndices; i++ )
    {
``` | (8-3a) |
| ```
        palette_index_idc
        PaletteIndexIdc[ i ] = palette_index_idc
    }
``` | |
| | (8-3b) |
| ```
    if(currentPaletteSize != 0 && palette_escape_val_present_flag ) {
        num_escape_val_minus1
``` | (8-4) |
| ```
        for( i = 0; i <= num_escape_val_minus1; i++ )
            for( cIdx = 0; cIdx < numComps; cIdx++ ) {
                if( cIdx = = 0 | |
                    ( xR % 2 = = 0 && yR % 2 = = 0 && ChromaArrayType = = 1 ) | |
                    ( xR % 2 = = 0 && ChromaArrayType = = 2 ) | |
                    ChromaArrayType = = 3 ) {
                    palette_escape_val
                    PaletteEscapeValTemp[ i ][ cIdx ] = palette_escape_val
                }
``` | (8-5a) |
| | (8-5b) |
| ```
            }
    }
``` | |

TABLE 8-continued

|  | Note |
|---|---|
| NumPaletteRunType = NumPaletteIndices <br> RunTypeIdx = 0 <br> While( NumPaletteRunType ) <br> { <br>     palette_run_type_flag <br>     PaletteRunType [ RunTypeIdx ] = palette_run_type_flag <br>     if ( PaletteRunType [ RunTypeIdx ] = = COPY_INDEX_MODE ) <br>         NumPaletteRunType - = 1 <br>     RunTypeIdx++ <br> } <br> NumRunLengths = RunTypeIdx - 1 <br> for( i=0; i < NumRunLengths ; i++ ) <br> { <br>     palette_run_msb_id_plus1 <br>     PaletteRunMsbIdPlus1[ i ] = palette_run_msb_id_plus1 <br> } <br> } <br> ... <br> NumRunLengths = 0 <br> CurrNumRunTypes = 0 <br> ... <br> while( PaletteScanPos < nCbS * nCbS ) { <br>     ...... <br>     if( MaxPaletteIndex > 0 && CurrNumIndices < NumPaletteIndices ) { <br>         if( PaletteScanPos >= nCbS && palette_run_type_flag[ xcPrev ][ ycPrev ] <br>             != COPY_ABOVE_MODE && PaletteScanPos < nCbS * nCbS - 1) { <br>             PaletteRunTypeFlag[ xC ][ yC ] = PaletteRunType [ CurrNumRunTypes ] <br>         } <br>         ... <br>         if( maxPaletteRun > 0 ) { <br>         ...... <br>             palette_run_refinement_bits <br>         } <br>         CurrNumRunTypes++ <br>     .......... <br> if( palette_escape_val_present_flag ) { <br>     sEscapeIdx = 0 <br>     sPos = 0 <br>     while( sPos < nCbS * nCbS ) { <br>         xC = x0 + travScan[ sPos ][ 0 ] <br>         yC = y0 + travScan[ sPos ][ 1 ] <br>         if( PaletteIndexMap[ xC ][ yC ] = = MaxPaletteIndex ) { <br>             for( cIdx = 0; cIdx < numComps; cIdx++ ) <br>                 PaletteEscapeVal[ cIdx ][ xC ][ yC ] = <br>                       PaletteEscapeValTemp[ sEscapeIdx++ ][ cIdx ] <br>         } <br>     } <br>     sPos++ <br> } | (8-6a) <br><br><br><br><br><br><br><br> (8-6b) <br><br> (8-7a) <br><br><br> (8-7b) <br><br><br><br><br><br><br><br><br><br><br><br><br><br><br><br> (8-8a) <br><br> (8-8b) |

Several variations of Example 13 are also disclosed as follows:

a. The combination of number of palette indices and last_run_type flag can be replaced by the number of run type.

b. The combination of number of palette indices and last_run_type flag can be replaced by the combination of number of copy above run and the last_run_type flag.

c. The combination of number of palette indices and last_run_type flag can be replaced by the combination of number of copy index run and the last_run_type flag.

Example 14

The order of palette index map coding is: number of escape pixels→escape pixel group→number of palette indices→last_run_type→palette index group→run type group→run length group. One example of syntax table for this embodiment is shown in Table 9. One example of syntax table for this embodiment is shown in Table 9. In Table 9, the last run type is signal as indicated by Note (9-1). The number of escape pixels is signaled as indicated by Note (9-2). The escape pixel group is signaled by syntax lines from Note (9-3a) through Note (9-3b). The palette index group is signaled by syntax lines from Note (9-4a) through Note (9-4b). The run type group and the run length group are similar to other syntax tables. Therefore, the run type group and the run length group are omitted from the Table 9.

TABLE 9

|  | Note |
|---|---|
| if( MaxPaletteIndex > 0 ) { |  |
|     palette_transpose_flag |  |
|     last_palette_run_type_flag | (9-1) |
|     if(currentPaletteSize != 0 && palette_escape_val_present_flag ) { |  |
|         num_escape_val_minus1 | (9-2) |
|         for( i = 0; i <= num_escape_val_minus1; i++ ) | (9-3a) |
|             for( cIdx = 0; cIdx < numComps; cIdx++ ) { |  |
|                 if( cIdx = = 0 \|\| |  |
|                     ( xR % 2 = = 0 && yR % 2 = = 0 && ChromaArrayType = = 1 ) \|\| |  |
|                     ( xR % 2 = = 0 && ChromaArrayType = = 2 ) \|\| |  |
|                     ChromaArrayType = = 3 ) { |  |
|                     palette_escape_val |  |
|                     PaletteEscapeValTemp[ i ][ cIdx ] = palette_escape_val |  |
|                 } | (9-3b) |
|             } |  |
|         } |  |
|     num_palette_indices_idc |  |
|     for( i=0; i < NumPaletteIndices; i++ ) | (9-4a) |
|     { |  |
|         palette_index_idc |  |
|         PaletteIndexIdc[ i ] = palette_index_idc |  |
|     } | (9-4b) |
| } |  |
| .... |  |
| if( palette_escape_val_present_flag ) { |  |
|     sEscapeIdx = 0 |  |
|     sPos = 0 |  |
|     while( sPos < nCbS * nCbS ) { |  |
|         xC = x0 + travScan[ sPos ][ 0 ] |  |
|         yC = y0 + travScan[ sPos ][ 1 ] |  |
|         if( PaletteIndexMap[ xC ][ yC ] = = MaxPaletteIndex ) { |  |
|             for( cIdx = 0; cIdx < numComps; cIdx++ ) |  |
|                 PaletteEscapeVal[ cIdx ][ xC ][ yC ] = |  |
|                       PaletteEscapeValTemp[ sEscapeIdx++ ][ cIdx ] |  |
|         } |  |
|         sPos++ |  |
|     } |  |
| } |  |

Several variations of Example 14 are also disclosed as follows:

a. The combination of number of palette indices and last_run_type flag can be replaced by the number of run type.

b. The combination of number of palette indices and last_run_type flag can be replaced by the combination of number of copy above run and the last_run_type flag.

c. The combination of number of palette indices and last_run_type flag can be replaced by the combination of number of copy index run and the last_run_type flag.

Example 15

The order of palette index map coding is: number of escape pixels→escape pixel group→number of palette indices→last_run_type→palette index group→run type group→context coded bin(s) of run length group→bypass coded bin(s) of run length group. One example of syntax table for this embodiment is shown in Table 10. In Table 10, the last run type is signal as indicated by Note (10-1). The number of escape pixels is signaled as indicated by Note (10-2). The escape pixel group is signaled by syntax lines from Note (10-3a) through Note (10-3b). The number of palette indices is signal as indicated by Note (10-4). The palette index group is signaled by syntax lines from Note (10-5a) through Note (10-5b). The run type group is signaled by syntax lines as indicated by Note (10-6a) through syntax line indicated by Note (10-6b). The context coded bin(s) of run length group is signaled by syntax lines as indicated by Note (10-7a) through syntax line indicated by Note (10-7b). The bypass coded bin(s) of run length group is signaled by syntax lines as indicated by Note (10-8a) through syntax line indicated by Note (10-8b).

TABLE 10

| | |
|---|---|
| if( MaxPaletteIndex > 0 ) { | |
|     palette_transpose_flag | |
|     last_palette_run_type_flag | (10-1) |
|     if(currentPaletteSize != 0 && palette_escape_val_present_flag ) { | |
|         num_escape_val_minus1 | (10-2) |
|         for( i = 0; i <= num_escape_val_minus1; i++ ) | (10-3a) |
|             for( cIdx = 0; cIdx < numComps; cIdx++ ) { | |
|                 if( cIdx = = 0 \|\| | |
|                     ( xR % 2 = = 0 && yR % 2 = = 0 && ChromaArrayType = = 1 ) \|\| | |
|                     ( xR % 2 = = 0 && ChromaArrayType = = 2 ) \|\| | |

TABLE 10-continued

```
            ChromaArrayType = = 3 ) {
            palette_escape_val
            PaletteEscapeValTemp[ i ][ cIdx ] = palette_escape_val
        }                                                                        (10-3b)
        }
    }
    num_palette_indices_idc                                                      (10-4)
    for( i=0; i < NumPaletteIndices; i++ )                                       (10-5a)
    {
        palette_index_idc
        PaletteIndexIdc[ i ] = palette_index_idc
    }                                                                            (10-5b)
    NumPaletteRunType = NumPaletteIndices
    RunTypeIdx = 0
    While( NumPaletteRunType )                                                   (10-6a)
    {
        palette_run_type_flag
        PaletteRunType [ RunTypeIdx ] = palette_run_type_flag
        if ( PaletteRunType [ RunTypeIdx ] = = COPY_INDEX_MODE )
            NumPaletteRunType - = 1
        RunTypeIdx++
    }                                                                            (10-6b)
    NumRunLengths = RunTypeIdx - 1
    for( i=0; i < NumRunLengths ; i++ )                                          (10-7a)
    {
        palette_run_msb_id_plus1
        PaletteRunMsbIdPlus1[ i ] = palette_run_msb_id_plus1
    }                                                                            (10-7b)
}
...
NumRunLengths = 0
CurrNumRunTypes = 0
...
while( PaletteScanPos < nCbS * nCbS ) {
    ......
    if( MaxPaletteIndex > 0 && CurrNumIndices < NumPaletteIndices ) {
        if( PaletteScanPos >= nCbS && palette_run_type_flag[ xcPrev ][ ycPrev ]
            != COPY_ABOVE_MODE && PaletteScanPos < nCbS * nCbS - 1 ) {
            PaletteRunTypeFlag[ xC ][ yC ] = PaletteRunType [ CurrNumRunTypes ]
        }
        ...
        if( maxPaletteRun > 0 ) {                                                (10-8a)
            ......
            palette_run_refinement_bits
        }                                                                        (10-8b)
        CurrNumRunTypes++
    ..........
if( palette_escape_val_present_flag ) {
    sEscapeIdx = 0
    sPos = 0
    while( sPos < nCbS * nCbS ) {
        xC = x0 + travScan[ sPos ][ 0 ]
        yC = y0 + travScan[ sPos ][ 1 ]
        if( PaletteIndexMap[ xC ][ yC ] = = MaxPaletteIndex ) {
            for( cIdx = 0; cIdx < numComps; cIdx++ )
                PaletteEscapeVal[ cIdx ][ xC ][ yC ] =
                    PaletteEscapeValTemp[ sEscapeIdx++ ][ cIdx ]
        }
    }
    sPos++
}
...
```

Several variations of Example 15 are also disclosed as follows:

a. The combination of number of palette indices and last_run_type flag can be replaced by the number of run type.

b. The combination of number of palette indices and last_run_type flag can be replaced by the combination of number of copy above run and the last_run_type flag.

c. The combination of number of palette indices and last_run_type flag can be replaced by the combination of number of copy index run and the last_run_type flag.

Example 16

The order of palette index map coding is: run type+context coded bin of run length group→bypass coded bin(s) of run length group→palette index group→escape pixel group. One example of syntax table for this embodiment is shown in Table 11. In Table 11, the run type+context coded bin of run length group is signaled by syntax lines from Note (11-1a) through Note (11-1b). The bypass coded bin(s) of run length group group is signaled by syntax lines from Note (11-2a) through Note (11-2b). The palette index group group is signaled by syntax lines as indicated by Note (11-3a) through syntax line indicated by Note (11-3b). The escape pixel group is signaled by syntax lines as indicated by Note (11-4a) through syntax line indicated by Note (11-4b)

TABLE 11

```
if( MaxPaletteIndex > 0) {
    palette_transpose_flag
while(palette_ran_context != RESTOFBLOCK)                                    (11-1a)
{
palette_run_type
palette_run_context
}                                                                            (11-1b)
    for( i=0; i < NumRunType; i++ )                                          (11-2a)
    {
        if( palette_run_context [ i ] != 0 || palette_ran_context [ i ] != 1 ||
                palette_ran_context [ i ] != RESTOFBLOCK
            palette_run_bypass
    }                                                                        (11-2b)
    for( i=0; i < NumPaletteIndices; i++ )                                   (11-3a)
    {
        palette_index_idc
        PaletteIndexIdc[i] = palette_index_idc
    }                                                                        (11-3b)
if( palette_escape_val_present_flag ) {
    sPos = 0
    while( sPos < nCbS * nCbS ) {
        xC = x0 + travScan[ sPos ][ 0 ]
        yC = y0 + travScan[ sPos ][ 1 ]
        if( PaletteIndexMap[ xC ][ yC ] = = MaxPaletteIndex )                (11-4a)
            for( cIdx = 0; cIdx < numComps; cIdx++ )
                if ( cIdx = = 0 ||
                    ( xR % 2 = = 0 && yR % 2 = = 0 && ChromaArrayType = = 1 ) ||
                    ( xR % 2 = = 0 && ChromaArrayType = = 2 ) ||
                    ChromaArrayType = = 3 ) {
                        palette_escape_val
                        PaletteEscapeVal[ cIdx ][ xC ][ yC ] = palette_escape_val
                }                                                            (11-4b)
        }
        sPos++
    }
}
```

An example of coded bins of run length is shown in Table 12a with maximum context number equal to 5.

a. If the number of parsed context coded bins of run length is a pre-defined value, such as the number of contexts for run length (which is equal to 5 in SCM3.0), and the last parsed bin is different from other bins (0 in the example), run length is up to the end of the block. In this case, bypass coded bin of run length for the pixel can be skipped.

b. If the number of parsed context coded bins of run length is less than or equal to 2, i.e. 1 or 2, bypass coded bins of run length for the pixel can be skipped.

c. If number of parsed context coded bins of run length is same as the number of contexts for run length, such as 5 in SCM3.0, and the all parsed bin are same value (1 in the example), bypass coded bins is parsed with Golumb-rice code with parameter 3 and without any context.

d. When predefined value is smaller than maximum number of contexts, signalling by-pass coded bins is changed accordingly. Table 12b illustrates one of examples for the case that the predefined value is equal to 3.

TABLE 12a

| Run length | Context coded bin(s) | By-pass coded bin: x can be 0 or 1 |
|---|---|---|
| 0 | 0 | |
| 1 | 10 | |
| 2~3 | 110 | x |
| 4~7 | 1110 | xx |
| Run to the end of block | 11110 | |
| 8~15 | 11111 | 0xxx |

TABLE 12a-continued

| Run length | Context coded bin(s) | By-pass coded bin: x can be 0 or 1 |
|---|---|---|
| 16~32 | 11111 | 10xxxx |
| ... | ... | ... |

TABLE 12b

| Run length | Context coded bin(s) | By-pass coded bin: x can be 0 or 1 |
|---|---|---|
| 0 | 0 | |
| 1 | 10 | |
| Run to the end of block | 110 | |
| 2~3 | 1110 | x |
| 4~7 | 11110 | xx |
| 8~15 | 11111 | 0xxx |
| 16~32 | 11111 | 10xxxx |
| ... | ... | ... |

In Examples 8 through 16, various ordering of the syntax groups and/or interleaved groups and related parameters are shown to implement embodiments of the present invention. These examples are not meant to provide an exhaustive list of all possible group/interleaved group ordering incorporating the present invention. For example, the coding of number of escape pixels (if present) can be in anywhere before the coding of escape pixel group. In another example, the coding of run type and run length can still be interleaved pair such as {run type 0, run length 0}, {run type 1, run length 1}, {run type 2, run length 2}, etc. In yet another example, the coding of escape pixel group can be in anywhere before the coding of run length group. In yet another example, the coding of "number of run types" and "number of copy index runs" can be adjusted by 1 as the very first run has to be copy index. In yet another example, if the palette run group are decode before palette run group, the maximum possible run can be further subtracted by number of rest run modes for the palette run singalling. For example, maxPaletteRun=nCbS*nCbS−scanPos−1−number of rest COPY_ABOVE_MODE−number of rest COPY_INDEX_MODE.

In SCM-4.0, the context formation of palette run depends on palette index. So the palette index can only be coded before palette run. In order to group the palette index at the end, the context formation of palette run should be independent to the palette index. In Examples 10, 11 and 16, the context formation of palette run can be changed so that that it only depends on the current palette run mode, the previous palette run mode, the previous palette run, the palette run mode of the above sample, the palette run of the above sample, or a combination of the above information. In another variation, the palette runs are coded with bypass bins.

Cross-Cu Copy Pixel for Palette Copy Above Mode

In JCTVC-T0036 (Sun, et al., CE1: *Tests A.1: Extended copy above mode to the first line* (1.1-1.5), Joint Collaborative Team on Video Coding (JCT-VC) of ITU-T SG 16 WP 3 and ISO/IEC JTC 1/SC 29/WG 11, 20th Meeting: Geneva, CH, 10-18 Feb. 2015, Document: JCTVC-T0036), the copy above mode in palette allows to copy pixels from above CU. However, it might need a line buffer to store the pixel values from above CU or CTU. This line buffer can be shared with Intra prediction process. In order to overcome this line buffer issue, a method to reduce the line buffer requirement is disclosed as follows.

Embodiment 1: Restricted Copy Above Mode for CTU Boundary

When the above CU is in another CTU, the copy_above_run mode is not allowed for the first line. The restriction can be applied in normatively or non-normatively. For normative method, the palette run type is inferred as index_run mode (i.e., copy-index mode) for the first line. For non-normative method, the palette_run_mode is forced to be index_run mode for the first line. Otherwise, the bitstream is not a conformance bitstream.

Embodiment 2: Replacement Pixels for the Pixel in the Above CTU

When the above CU is in another CTU, the pixels in the above CTU are replaced by the replacement pixels in palette mode. The replacement pixels can be predefined pixels, such as 128 or (1<<(bitdepth−1)), where bitdepth represents the bit depth of the pixel value. Alternatively, the replacement pixels can have a palette index equal to a predefined value such as 0.

Palette Syntax Coding when Combining Copy Index/Pixel for First Row and Move Index Group in Front When the copy above index/pixel for the first row of JCTVC-T0036 is applied, the partial redundant index removal is required. The variable adjustedIndexMax depends on the previous coded palette run mode and whether the above sample is copied from neighboring CU. However, in JCTVC-T0065, the method of moving index group in front is applied, and the adjustedIndexMax is always a fixed value except for the first index. In order to solve this conflict, several methods are disclosed as follows.

Embodiment 1

Syntax Order According to Embodiment 1 is as Follows:
Syntax order according to embodiment 1 is as follows: number of copy_above_run or number of index_run→last_run_mode→run type group→palette index group→run length group→escape pixel group
  a. The last_run_mode indicates whether the last run mode is copy_above_run or index_run (i.e., copy-index mode). For example, when coding/decoding run type group, if the encoded/decoded index_run number equal to the number of index_run and the last_run_mode is index_run, the run type group will be terminated. If the encoded/decoded index_run number equal to the number of index_run and the last_run_mode is copy_above_run, the run type group will be also terminated and a copy_above_run syntax element is inserted at the end.
  b. The redundant index removal is not applied when previous coded run mode is copy_above_run. Therefore, when previous coded run is copy_above_run the maximum index number will not decreased by 1, and the actual index is signaled.

Embodiment 2

Syntax Order According to Embodiment 2 is as Follows:
Number of copy_above_run or number of index_run→run type group→last_run_mode→palette index group→run length group→escape pixel group
  a. The last_run_mode indicates the last run mode is copy_above_run or index_run. For example, when coding/decoding run type group, if the encoded/decoded index_run number equal to the number of index_run, a last_run_mode is signaled. If the last_run_mode is copy_above_run, a copy_above_run syntax element is inserted at the end.
  b. The redundant index removal is not applied when previous coded run mode is copy_above_run. Therefore, when previous coded run is copy_above_run the maximum index number will not decreased by 1, and the actual index is signaled.

Embodiment 3

Syntax Order According to Embodiment 3 is as Follows:
Number of copy_above_run or number of index_run→run type group→palette index group→last_run_mode→run length group→escape pixel group
  a. The last_run_mode indicates whether the last run mode is copy_above_run or index_run. For example, if the last_run_mode is copy_above_run, a copy_above_run is inserted at the end.
  b. The redundant index removal is not applied when previous coded run mode is copy_above_run. Therefore, when previous coded run is copy_above_run the maximum index number will not decreased by 1, and the actual index is signaled.

Embodiment 4

Truncated Binary Code+Conditional 1 Bit

When the decoder parses all indices, the decoder assumes the redundant index removal has been applied on all indices and the index value range is calculated assuming the redundant index removed. For example, the adjustedIndexMax is equal to indexMax for the first index and is equal to indexMax−1 for the rest indices.

The decoder then decodes run modes and runs. During decoding run modes and runs, if a certain condition is true for an index run mode, additional index information for the index value is signaled or decoded, such as one addition bit, and the redundant index removal is not applied.

The condition might be one of the following items or the combination of the following items:
a. Previous coded palette run mode is a copy above run mode.
b. Previous coded palette run mode is a copy above run mode and the parsed index is equal to indexMax−1 (the adjustedIndexMax).
c. Previous coded palette run mode is a copy above run mode, the above sample is copied from a neighboring CU.
d. Previous coded palette run mode is a copy above run mode, the above sample is copied from a neighboring CU, and the parsed index is equal to indexMax−1 (the adjustedIndexMax).
e. Previous coded palette run mode is copy above run mode or the current index mode is the first index mode.
f. Previous coded palette run mode is a copy above run mode and the parsed index is equal to indexMax−1 (the adjustedIndexMax) or the current index mode is the first index mode
g. Previous coded palette run mode is a copy above run mode, the above sample is copied from a neighboring CU or the current index mode is the first index mode.
h. Previous coded palette run mode is a copy above run mode, the above sample is copied from a neighboring CU, and the parsed index is equal to (indexMax−1) (i.e., the adjustedIndexMax) or the current index mode is the first index mode.

The one addition bit can help to reconstruct the actual index in the decoder. For example, when condition-d is true, the parsed index is the actual index. However, since the adjustedIndexMax is equal to indexMax−1, the actual index equal to (indexMax−1) and indexMax are mapped to indexMax−1. The one addition bit use to tell the current index is (indexMax−1) or indexMax.

In the encoder side, when the condition is true, the redundant index removal is not applied and the actual index is signaled. When sending the index, the adjustedIndexMax is set equal to (indexMax−1). If the actual index is equal to indexMax, the value of (indexMax−1) is signaled. If the actual index is equal to indexMax or (indexMax−1), one additional bit is signaled to tell whether the current index is indexMax or indexMax−1.

For the first index, the redundant index removal is not applied. The adjustedIndexMax is set equal to indexMax, and the actual index is signaled.

In one example, the redundant index removal is not applied for the first index. However, the adjustedIndexMax is set equal to (indexMax−1), and the actual index is signaled. In encoder side, if the actual index is equal to indexMax, the value of indexMax−1 is signaled. If the actual index is equal to indexMax or (indexMax−1), one additional bit is signaled to indicate whether the current index is indexMax or indexMax−1. In the decoder side, if the parsed index is equal to (indexMax−1) (i.e., the adjustedIndexMax), one addition bit is decoded to indicate whether the current index is (indexMax−1) or indexMax.

This additional bit can be coded in bypass bin, or context coded bin. If the context coded bin is used, the additional bit can use single context or multiple contexts. If the multiple contexts are used, the context formaition can depends on sample position, run mode order (e.g. checking if it's the first index mode), the neighboring run mode or previous coded run mode.

Embodiment 5

Truncated Binary Code+Conditional 1 Bit+Syntax Reordering

Embodiment 5 corresponds to combining embodiment 4 and embodiment 1 without item b, combining embodiment 4 and embodiment 2 without item b, or combining embodiment 4 and embodiment 3 without item b.

Embodiment 6

Redundant "Run Mode Bit" Removal

When the decoder parses all index values, the decoder assumes the redundant index removal is not applied. All index values are allocated in the index buffer.

During run pattern decoding, if previous run is a copy index run and previous index is equal to the current to-be-used index in the buffer, the current should be a copy above run. Otherwise, the current index coding can be merged into the previous run. The current "Run Mode Bit" can be saved.

Context Formation for Palette Run Mode

Another aspect of the present invention addresses different context formation for the first palette run mode. The context formation for the first palette run mode is different from the context formation of the rest palette run modes.

In one embodiment, the first palette run mode uses an independent context set, and the rest palette run modes use other context sets. For example, the first palette run mode uses context-0, and the rest palette run modes use context-1. In another example, the first palette run mode uses context-0 and context-1, and the rest palette run modes use context-2 and context-3. In yet another example, the first palette run mode uses context-0 and context-1, and the rest palette run modes use context-0 and context-2.

Copy Above Mode Under Index Map Flipping

In JCTVC-T0119 (Xiu, et al., *Non-CE1: improved palette run-length coding with palette flipping*, Joint Collaborative Team on Video Coding (JCT-VC) of ITU-T SG 16 WP 3 and ISO/IEC JTC 1/SC 29/WG 11, 20th Meeting: Geneva, CH, 10-18 Feb. 2015, Document: JCTVC-T0119), a method to flip the index map before index map coding. However, after the decoder flips index map, the prediction source for copy above run is not the physical nearest pixel.

Figure 3:
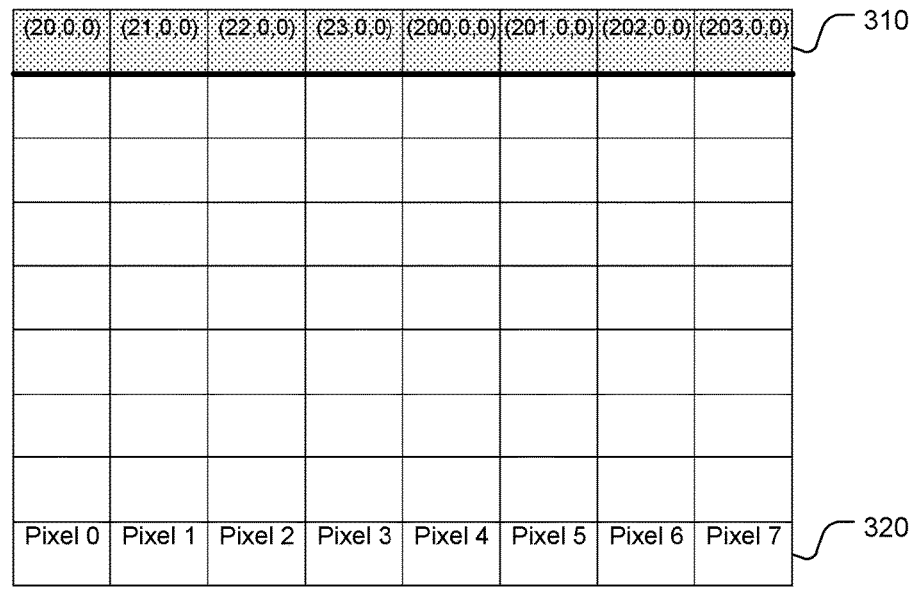
FIG. 3 illustrates an example of index map of an original coding unit, where the index map is predicted using neighboring CU pixels (NCPs).
Figure 4:
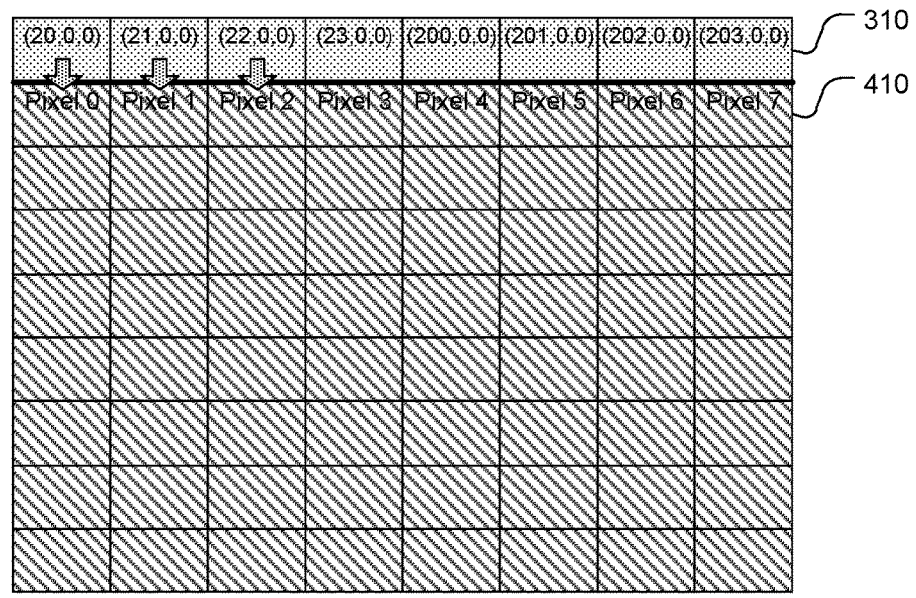
FIG. 4 illustrates an example of index map prediction after index map flipping, where the latest row is flipped to the first row and is predicted by the above neighboring CU pixels (NCPs).
Figure 5:
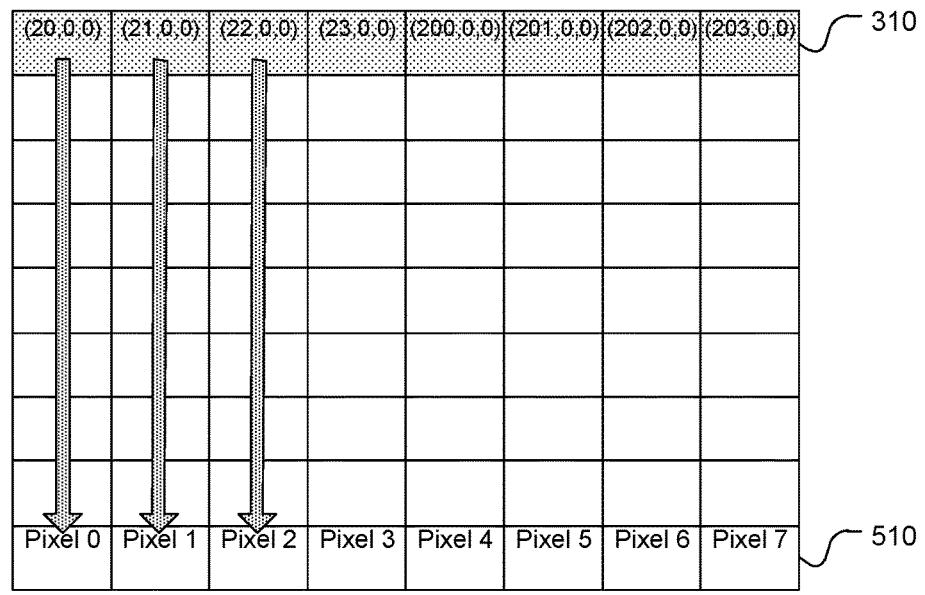
FIG. 5 illustrates an example of index map prediction with index map flipping, where the above neighboring CU pixels (NCPs) are used to predict the farthest pixels in the physical position for the current CU.

FIG. 3 shows an example of pixel data of a coding unit, where row 310 represents neighboring CU pixels (NCPs). After index map flipping, the pixels in the latest row (i.e., row 320 including Pixel 0 to Pixel 7) will be flipped to the first row and are predicted by the above NCP as shown in FIG. 4. In FIG. 4, the area filled with slanted lines indicates the flipped index map while the white area in FIG. 3 indicates the original index map. After index map flipping, the farthest row (i.e., row 320) in FIG. 3 becomes the top row (i.e., row 410) in FIG. 4. In this case, NCP based prediction is equivalent to using the above NCP to predict the farthest pixels (i.e., the latest row) in the physical position for the current CU as shown in FIG. 5. In other words, the NCPs in row 310 are used to predict row 510 in the physical position. Apparently, it is inefficient because the distance between predictor and to-be-predicted index is large.

In order to overcome the prediction efficiency issue associated with index map flipping, a method is disclosed to use the nearest physical neighboring pixels as predictor if the copy above mode is selected.

Embodiment 1

Figure 6:
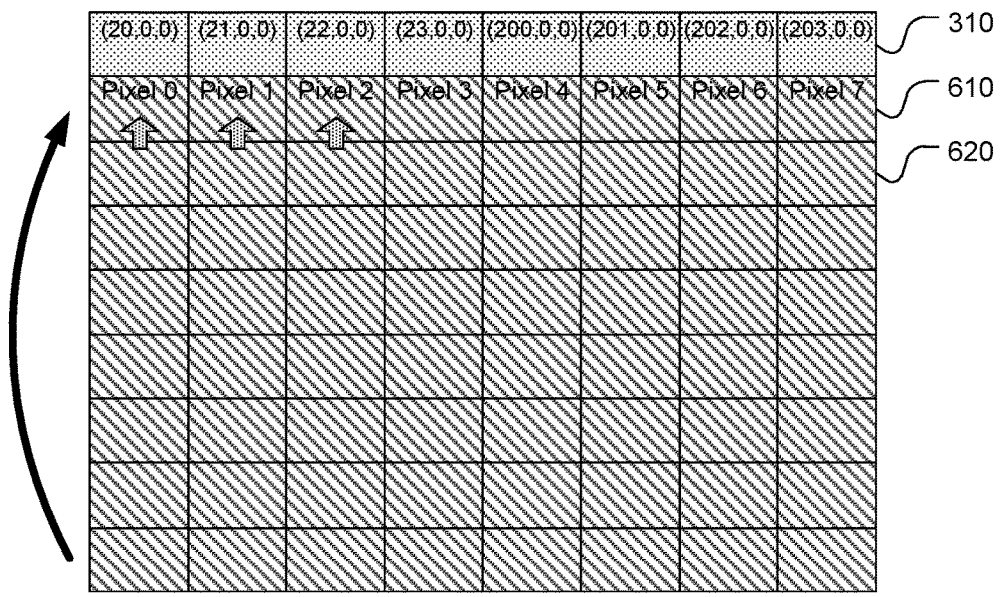
FIG. 6 illustrates an example of index prediction according to one embodiment of the present invention, where after index flipping the top row is predicted by its corresponding physical above row.
Figure 7:
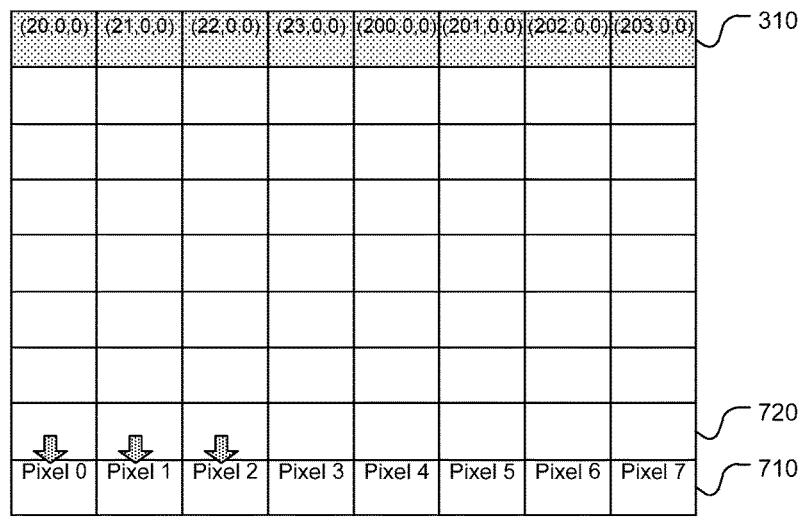
FIG. 7 illustrates the equivalent index prediction corresponding to FIG. 6 in the original index map, where the latest row is predicted by the above row.

According to embodiment 1, regardless if the index map is flipped or not, index coded in the copy above run mode is prediction from its physical above position, or left position if transpose flag is on. FIG. 6 illustrates an example of index prediction incorporating this embodiment. After index flipping, the top row (i.e., row 610) is predicted by its corresponding physical above row (i.e., row 620), where the line-filled area indicates the flipped index map. FIG. 7 illustrates the equivalent index prediction in the original index map, where the latest row (i.e., row 710) is predicted by the above row (i.e., row 720).

For indices coded in the copy above run mode with prediction from its physical above position as disclosed in embodiment 1, additional information can be signaled to indicate the "Run Scan Starting Position" or "Scan Pattern" according to an extended embodiment. The "Run Scan Starting Position" can be top-left, top-right, bottom-left or bottom-right. "Scan Pattern" can be horizontal scan, vertical scan, horizontal traverse scan or vertical traverse scan.

Embodiment 2

Figure 8:
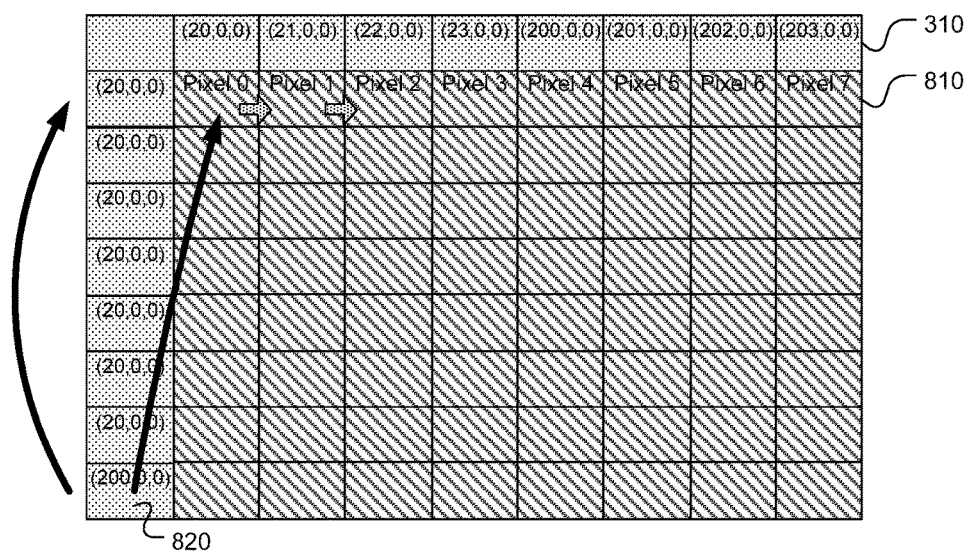
FIG. 8 illustrates an example of index prediction according to one embodiment of the present invention, where after index map flipping the latest row becomes the first row.
Figure 9:
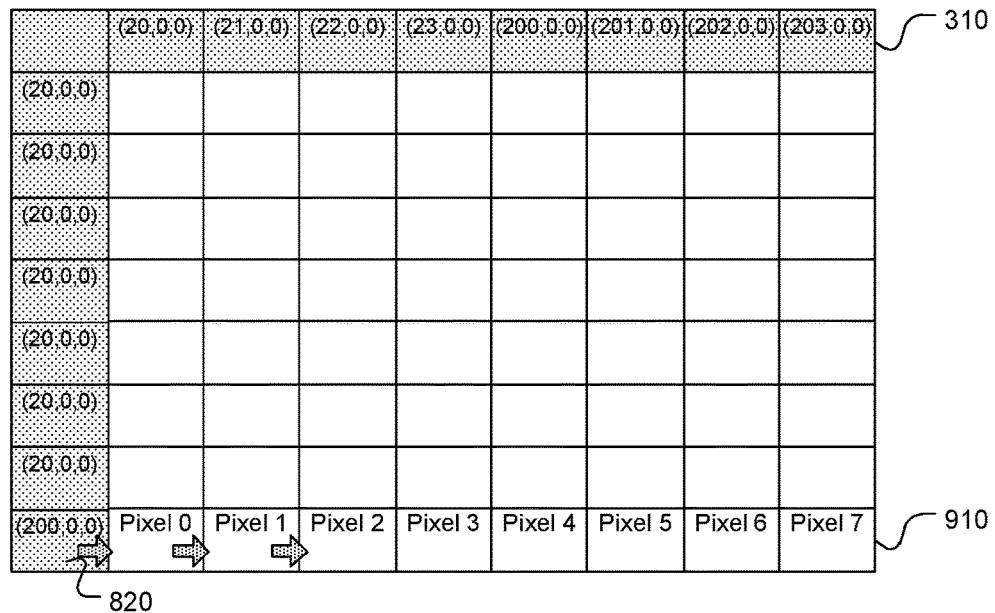
FIG. 9 illustrates the equivalent index prediction corresponding to FIG. 8 in the original index map, where the latest row is predicted by a bottom pixel in the left CU.

If the index map is flipped and the transpose flag is off, pixels coded in the copy above run in the first row are predicted from its physical nearest left position. FIG. 8 illustrates an example of index prediction incorporating this embodiment. After index map flipping, the latest row becomes the first row (i.e., row 810). In this case, the first pixel (i.e., Pixel 0) in row 810 is predicted by the bottom pixel 820 in the left CU. Furthermore, Pixel 1 is predicted by the left pixel (i.e., Pixel 0) and so on. FIG. 9 illustrates the equivalent index prediction in the original index map, where the latest row (i.e., row 910) is predicted by the bottom pixel 820 in the left CU.

Embodiment 3

Figure 10:
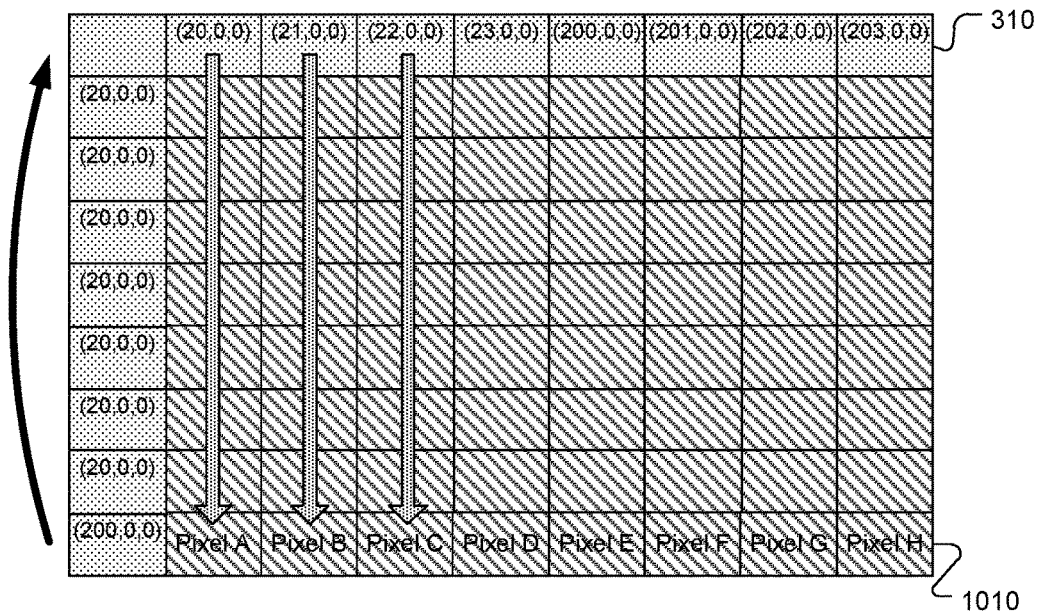
FIG. 10 illustrates an example of index, where the last row in the flipped index map is predicted by its physical above neighboring CU pixel according to one embodiment of the present invention.
Figure 11:
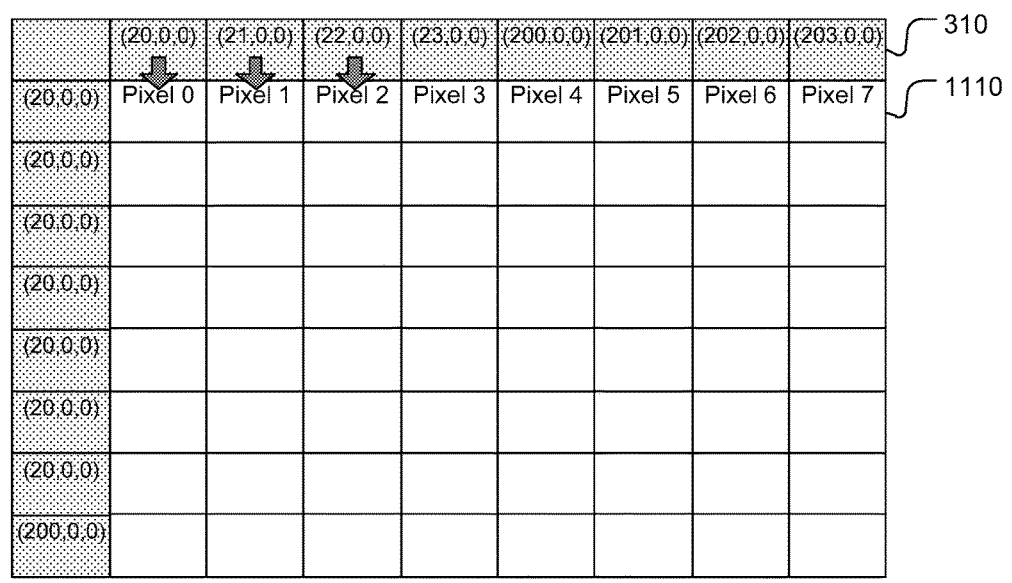
FIG. 11 shows the equivalent index prediction corresponding to FIG. 10 in the physical position, where the last row in the flipped index map is predicted by its physical above neighboring CU pixel.

If the index map is flipped and transpose flag is off, pixels coded in the copy above run mode in the last row or the last M rows of the flipped index map are predicted from its physical above neighboring CU pixel. FIG. 10 illustrates an example of index prediction for M=1, where the last row (i.e., row 1010) in the flipped index map is predicted by its physical above neighboring CU pixel (i.e., row 310). FIG. 11 shows the equivalent index prediction in the physical position (i.e., the original index map), where the last row in the flipped index map (i.e., the first row 1110 of the original index map) is predicted by its physical above neighboring CU pixel (i.e., row 310). M can be 1, 2, or 3. M can be dependent on CU size. M can be signaled.

High-Level Control of Palette Coding Syntax

In order to provide flexibility and/or increase syntax coding efficiency, various palate syntax controls, such as controlling whether to transpose index map, at SPS, PPS or slice level are disclosed as follows.

Embodiment 1: SPS Level Control for CU Level Palette Transpose Flag

In Embodiment 1, a SPS (sequence parameter set) palette transpose flag, sps_palette_transpose_flag is used to specify whether a SPS level two-bit syntax element is signaled to control the CU level palette transpose flag (i.e., palette_transpose_flag). When sps_palette_transpose_flag is 0 or 1, the CU level palette_transpose_flag is inferred to be equal to sps_palette_transpose_flag. When sps_palette_transpose_flag is 2, a CU level palette_transpose_flag will be explicitly signaled to indicate the scanning order of the current CU. sps_palette_transpose_flag can be either bypass coded or context coded. An example syntax table is shown in Table 13, where the flag sps_palette_transpose_flag is incorporated as indicated by Note (13-2) if palette mode is enabled as indicated by Note (13-1).

TABLE 13

|  | Note |
|---|---|
| sps_scc_extensions( ) { | |
|   curr_pic_as_ref_enabled_flag | |
|   palette_mode_enabled_flag | |
|   if( palette_mode_enabled_flag ) { | (13-1) |
|     palette_max_size | |
|     delta_palette_max_predictor_size | |
|     sps_palette_transpose_flag | (13-2) |
|   } | |
|   ... | |
| } | |

In the CU level syntax table, the related syntax table is shown in Table 14, where the CU level palette transpose flag is incorporated as indicated by Note (14-2) if the SPS level flag sps_palette_transpose_flag is equal to 2 as indicated by Note (14-1).

TABLE 14

|  | Note |
|---|---|
| if( MaxPaletteIndex > 0) { | |
|   if( sps_palette_transpose_flag = =2 ) | (14-1) |
|     palette_transpose_flag | (14-2) |

In another example, a one-bit sps_palette_transpose_flag is signaled. If sps_palette_transpose_flag is equal to 0, the CU level palette_transpose_flag is inferred to be equal to sps_palette_transpose_flag. The scanning order of the sequence is horizontal scan. When sps_palette_transpose_flag is equal to 1, a CU level palette_transpose_flag will be explicitly signaled to indicate the scanning order of the current CU. sps_palette_transpose_flag can be bypass coded or context coded. The corresponding syntax table sps_scc_extensions( ) is the same as that in Table 13.

In the CU level syntax table, the related syntax is shown in Table 15, where the CU level palette transpose flag is incorporated as indicated by Note (15-2) if the SPS level flag sps_palette_transpose_flag is equal to 1 as indicated by Note (15-1).

TABLE 15

|  | Note |
|---|---|
| if( MaxPaletteIndex > 0) { | |
|   if( sps_palette_transpose_flag = =1 ) | (15-1) |
|     palette_transpose_flag | (15-2) |

In another example, a one-bit sps_palette_transpose_flag is signaled. If sps_palette_transpose_flag is equal to 0, the CU level palette_transpose_flag is inferred to be equal to sps_palette_transpose_flag. The scanning order of the sequence is horizontal scan. When sps_palette_transpose_flag is equal to 1, a CU level palette_transpose_flag will be explicitly signaled to indicate the scanning order of the current CU. sps_palette_transpose_flag can be bypass coded or context coded. The corresponding syntax table sps_scc_extensions( ) is the same as that in Table 13. In the CU level syntax table, the related syntax is the same as that in Table 15.

Embodiment 2: PPS Level Control for CU Level Palette Transpose Flag

In Embodiment 2, a PPS (picture parameter set) palette transpose flag, pps_palette_transpose_flag is used to specify whether a PPS level two-bit syntax element is signaled to control the CU level palette transpose flag (i.e., palette_transpose_flag). When pps_palette_transpose_flag is 0 or 1, the CU level palette_transpose_flag is inferred to be equal to pps_palette_transpose_flag. When pps_palette_transpose_flag is 2, a CU level palette_transpose_flag will be explicitly signaled to indicate the scanning order of the current CU. pps_palette_transpose_flag can be either bypass coded or context coded. An example syntax table is shown in Table 16, where the flag pps_palette_transpose_flag is incorporated as indicated by Note (16-1).

TABLE 16

|  | Note |
| --- | --- |
| pps_scc_extensions( ) { | |
|     sps_palette_transpose_flag | (16-1) |
| } | |

In the CU level syntax table, the related syntax is shown in Table 17, where the CU level palette transpose flag is incorporated as indicated by Note (17-2) if the PPS level flag pps_palette_transpose_flag is equal to 2 as indicated by Note (17-1).

TABLE 17

|  | Note |
| --- | --- |
| if( MaxPaletteIndex > 0) { | |
|   if( pps_palette_transpose_flag = =2 ) | (17-1) |
|     palette_transpose_flag | (17-2) |

In another example, a one-bit pps_palette_transpose_flag is signaled. If pps_palette_transpose_flag is equal to 0, the CU level palette_transpose_flag is inferred to be equal to pps_palette_transpose_flag. The scanning order of the palette index map is horizontal scan. When pps_palette_transpose_flag is equal to 1, a CU level palette_transpose_flag will be signaled to indicate the scanning order of the current CU. The corresponding syntax table for pps_scc_extensions( ) is the same as Table 16. In this case, the CU level palette transpose flag is signaled as shown in Table 18, where the CU level palette transpose flag is incorporated as indicated by Note (18-2) if the PPS level flag pps_palette_transpose_flag is equal to 1 as indicated by Note (18-1).

TABLE 18

|  | Note |
| --- | --- |
| if( MaxPaletteIndex > 0) { | |
|   if( pps_palette_transpose_flag = =1 ) | (18-1) |
|     palette_transpose_flag | (18-2) |

In an alternative approach, a one-bit pps_palette_transpose_flag is signaled. If pps_palette_transpose_flag is equal to 0, the CU level palette_transpose_flag is inferred to be equal to pps_palette_transpose_flag. The scanning order of the palette index map is vertical scan. If pps_palette_transpose_flag is equal to 1, a CU level palette_transpose_flag will be signaled to indicate the scanning order of the current CU. pps_palette_transpose_flag can be bypass coded or context coded. The corresponding syntax table for pps_scc_extensions( ) is the same as Table 16. In this case, the CU level palette transpose flag signaling is the same as Table 18.

Embodiment 3: Slice Level Control for CU Level Palette Transpose Flag

In Embodiment 3, a slice level palette transpose flag, slice_palette_transpose_flag is used to specify whether a slice level two-bit syntax element is signaled to control the CU level palette transpose flag (i.e., palette_transpose_flag). When slice_palette_transpose_flag is 0 or 1, the CU level palette_transpose_flag is inferred to be equal to slice_palette_transpose_flag. When slice palette_transpose_flag is 2, a CU level palette_transpose_flag will be explicitly signaled to indicate the scanning order of the current CU. slice palette_transpose_flag can be either bypass coded or context coded. An example syntax table is shown in Table 19, where the flag slice_palette_transpose_flag is incorporated as indicated by Note (19-1).

TABLE 19

|  | Note |
| --- | --- |
| pps_scc_extensions( ) { | |
|     slice_palette_transpose_flag | (19-1) |
| } | |

In the CU level syntax table, the related syntax table is shown in Table 20, where the CU level palette transpose flag is incorporated as indicated by Note (20-2) if the slice level flag slice_palette_transpose_flag is equal to 2 as indicated by Note (20-1).

TABLE 20

|  | Note |
| --- | --- |
| if( MaxPaletteIndex > 0) { | |
|   if( slice_palette_transpose_flag = =2 ) | (20-1) |
|     palette_transpose_flag | (20-2) |

In another example, a one-bit slice_palette_transpose_flag is signaled. If slice_palette_transpose_flag is equal to 0, the CU level palette_transpose_flag is inferred to be equal to slice_palette_transpose_flag. The scanning order of the palette index map is horizontal scan. When slice_palette_transpose_flag is equal to 1, a CU level palette_transpose_flag will be signaled to indicate the scanning order of the current CU. The corresponding syntax table for slice_segment_header( ) is the same as Table 19. In this case, the CU level palette transpose flag is signaled as shown in Table 21, where the CU level palette transpose flag is incorporated as indicated by Note (21-2) if the slice level flag slice_palette_transpose_flag is equal to 1 as indicated by Note (21-1).

TABLE 21

|  | Note |
| --- | --- |
| if( MaxPaletteIndex > 0) { | |
|   if( slice_palette_transpose_flag = =1 ) | (21-1) |
|     palette_transpose_flag | (21-2) |

In an alternative approach, a one-bit slice_palette_transpose_flag is signaled. If slice_palette_transpose_flag is equal to 0, the CU level palette_transpose_flag is inferred to be equal to slice_palette_transpose_flag. The scanning order of the palette index map is vertical scan. If slice_palette_transpose_flag is equal to 1, a CU level palette_transpose_flag will be signaled to indicate the scanning order of the current CU. slice_palette_transpose_flag can be bypass coded or context coded. The corresponding syntax table for slice_segment_header( ) is the same as Table 19. In this case, the CU level palette transpose flag signaling is the same as Table 21.

Embodiment 4: SPS and Slice Level Control for CU Level Palette Transpose Flag

In Embodiment 4, a two-bit mode indicator is disclosed for the SPS level palette transpose flag (i.e., sps_transpose_transpose_flag). When the mode is 0 or 1, the slice-level palette transpose flag (i.e., slice_palette_transpose_flag) is inferred to be equal to sps_palette_transpose_flag. The CU level palette_transpose_flag is inferred to be equal to slice_palette_transpose_flag. When sps_palette_transpose_flag is 2, the slice_palette_transpose_flag is sent explicitly in the slice header. The slice_palette_transpose_flag can be 0, 1, and 2. When slice_palette_transpose_flag is 0 or 1, the CU level palette_tranpose_flag is inferred to be equal to slice_palette_transpose_flag. When slice_palette_transpose_flag is 2, the CU level palette_transpose_flag will be explicitly signaled. Syntax table for sps_scc_extensions( ) is the same as that in Table 13.

An exemplary slice level syntax is shown in Table 22, where a slice level flag, slice_palette_transpose_flag is signaled as indicated by Note (22-2) when sps_transpose_transpose_flag is equal to 2 as indicated by Note (22-1). The CU level palette transpose flag signaling is the same as that in Table 20.

TABLE 22

|  | Note |
|---|---|
| slice_segment_header( ) { |  |
|   if( sps_palette_transpose_flag = =2 ) | (22-1) |
|     slice_palette_transpose_flag | (22-2) |
| } |  |

In another example, a one-bit mode indicator, sps_palette_transpose_flag is signaled at the SPS level. When the mode is 0, the slice level flag, slice_palette_transpose_flag is inferred to be equal to sps_palette_transpose_flag. The CU level palette_transpose_flag is inferred to be equal to slice_palette_transpose_flag. When sps_palette_transpose_flag is 1, the slice_palette_transpose_flag is sent explicitly in the slice header. The slice_palette_transpose_flag can be 0 or 1. When slice_palette_transpose_flag is 0, the CU level palette_transpose_flag is inferred to be equal to slice_palette_transpose_flag. When slice_palette_transpose_flag is 1, the CU level palette_transpose_flag will be explicitly signaled. For this example, Syntax table for sps_scc_extensions( ) can be the same as that in Table 13. An exemplary slice level syntax is shown in Table 23, where a slice level flag, slice_palette_transpose_flag is signaled as indicated by Note (23-2) when sps_transpose_transpose_flag is equal to 1 as indicated by Note (23-1), The CU level palette transpose flag is signaled the same as that in Table 15.

TABLE 23

|  | Note |
|---|---|
| if( MaxPaletteIndex > 0) { |  |
|   if( slice_palette_transpose_flag = =1 ) | (23-1) |
|     palette_transpose_flag | (23-2) |

In another example, a one-bit mode indicator, sps_palette_transpose_flag is signaled at the SPS level. When the mode is 0, the slice level slice_palette_transpose_flag is inferred to be equal to 1. The CU level palette_transpose_flag is inferred to be equal to 1. When sps_transpose_flag is 1, the slice_palette_transpose_flag is sent explicitly in the slice header. The slice_palette_transpose_flag can be 0 or 1. When slice_palette_transpose_flag is 0, the CU level palette_transpose_flag is inferred to be equal to 1. When slice_palette_transpose_flag is 1, the CU level palette_transpose_flag will be explicitly signaled. The syntax table will be the same as above.

Embodiment 5: PPS and Slice Level Control for CU Level Palette Transpose Flag

In embodiment 5, a two-bit mode indicator, pps_palette_transpose_flag is signaled at the PPS level. When the mode is 0 or 1, the slice-level slice_palette_transpose_flag is inferred to be equal to pps_transpose_flag. The CU level palette_transpose_flag is inferred to be equal to slice_palette_transpose_flag. When pps_transpose_flag is 2, the slice_palette_transpose_flag is signaled explicitly in the slice header. The slice_palette_transpose_flag can be 0, 1, and 2. When slice_palette_transpose_flag is 0 or 1, the CU level palette_transpose_flag is inferred to be equal to slice_palette_transpose_flag. When slice_palette_transpose_flag is 2, the CU level palette_transpose_flag will be explicitly signaled.

The syntax table pps_scc_extensions( ) can be the same as that in Table 16. An exemplary slice level syntax is shown in Table 24, where a slice level flag, slice_palette_transpose_flag is signaled as indicated by Note (24-2) when pps_transpose_transpose_flag is equal to 2 as indicated by Note (24-1). The CU level palette transpose flag is signaled the same as that in Table 20.

TABLE 24

|  | Note |
|---|---|
| slice_segment_header( ) { |  |
|   if( pps_palette_transpose_flag = =2 ) | (24-1) |
|     slice_palette_transpose_flag | (24-2) |
| } |  |

In another example, a one-bit mode indicator pps_transpose_flag is signaled at the PPS level. When the mode is 0, the slice-level slice_palette_transpose_flag is inferred to be equal to pps_transpose_flag. The CU level palette_transpose_flag is inferred to be equal to slice_palette_transpose_flag. When pps_transpose_flag is 1, the slice_palette_transpose_flag is sent explicitly in the slice header. The slice_palette_transpose_flag can be 0 or 1. When slice_palette_transpose_flag is 0, the CU level palette_transpose_flag is inferred to be equal to slice_palette_transpose_flag. When slice_palette_transpose_flag is 1, the CU level palette_transpose_flag will be explicitly signaled.

The syntax table pps_scc_extensions( ) can be the same as that in Table 25. An exemplary slice level syntax is shown in Table 25, where a slice level flag, slice_palette_transpose_flag is signaled as indicated by Note (25-2) when pps_transpose_transpose_flag is equal to 1 as indicated by Note (25-1). The CU level palette transpose flag is signaled the same as that in Table 20.

TABLE 25

|  | Note |
|---|---|
| slice_segment_header( ) { | |
| if( pps_palette_transpose_flag = =1 ) | (25-1) |
| slice_palette_transpose_flag | (25-2) |
| } | |

In another embodiment. A one-bit mode indicator is proposed for the PPS level, namely pps_transpose_flag. When the mode is 0, the slice-level slice_palette_transpose_flag is inferred to be equal to 1. The CU level palette_transpose_flag is inferred to be equal to 1. When pps_transpose_flag is 1, the slice_palette_transpose_flag is sent explicitly in the slice header. The slice_palette_transpose_flag can be 0 or 1. When slice_palette_transpose_flag is 0, the CU level palette_transpose_flag is inferred to be equal to 1. When slice_palette_transpose_flag is 1, the CU level palette_transpose_flag will be explicitly signaled. The syntax table will be the same as above.

Embodiment 6: SPS/PPS/Slice Level Control for CU Level Palette Transpose Flag

In embodiment 5, sps_palette_escape_control_flag specifies whether a SPS level 1-bit syntax element is signaled to control the slice level flag (slice_palette_escape_flag) or picture level flag (pps_palette_escape_flag). When sps_palette_escape_control_flag is 0, the slice_palette_escape_flag or pps_palette_escape_flag does not need to be signaled. They are inferred to be 1. When sps_palette_escape_control_flag is 1, the slice_palette_escape_flag or pps_palette_escape_flag needs to be signaled.

When the slice_palette_escape_flag or pps_palette_escape_flag is equal to 1 (together with other conditions such as current palette size is greater than 0), the CU level palette_escape_val_present_flag is signaled; otherwise, when the slice_palette_escape_flag or pps_palette_escape_flag is equal to 0, the CU level palette_escape_val_present_flag does not need to be signaled. In this case, it is inferred to be 0. In other words, no escape pixels are used in the current CU. Example syntax tables are shown below. For SPS level, an exemplary syntax table is shown in Table 26. Exemplary middle level syntax table for the PPS level or slice level is shown in Table 27 and Table 28 respectively.

As shown in Table 26, SPS level flag, sps_palette_escape_control_flag is signaled as indicated by Note (26-2) if palette_mode_enabled_flag is equal to 1 as indicated by Note (26-1). As shown in Table 27, pps_palette_escape_flag is signaled as indicated by Note (27-2) if both palette_mode_enabled_flag and sps_palette_escape_control_flag are equal to 1 as indicated by Note (27-1). As shown in Table 28, slice_palette_escape_flag is signaled as indicated by Note (28-2) if both palette_mode_enabled_flag and sps_palette_escape_control_flag are equal to 1 as indicated by Note (28-1).

TABLE 26

|  | Note |
|---|---|
| sps_scc_extensions( ) { | |
| curr_pic_as_ref_enabled_flag | |
| palette_mode_enabled_flag | |
| if( palette_mode_enabled_flag ) { | (26-1) |
| palette_max_size | |
| delta_palette_max_predictor_size | |
| sps_palette_escape_control_flag | (26-2) |
| } | |
| ... | |
| } | |

TABLE 27

|  | Note |
|---|---|
| pps_scc_extensions( ) { | |
| ... | |
| if(palette_mode_enabled_flag && | (27-1) |
| sps_palette_escape_control_flag ) { | |
| pps_palette_escape_flag | (27-2) |
| } | |

TABLE 28

|  | Note |
|---|---|
| slice_segment_header( ) { | |
| ... | |
| if(palette_mode_enabled_flag && | (28-1) |
| sps_palette_escape_control_flag ) { | |
| slice_palette_escape_flag | (28-2) |
| } | |

The CU level palette coding syntax corresponding to Table 27 and Table 28 are shown in Table 29 and Table 30 respectively. In Table 29, palette_escape_val_present_flag is signaled as indicated by Note (29-2) if CurrentPaletteSize is not equal to 0 and pps_palette_escape_flag is equal to 1 as indicated by Note (29-1). In Table 30, palette_escape_val_present_flag is signaled as indicated by Note (30-2) if CurrentPaletteSize is not equal to 0 and slice_palette_escape_flag is equal to 1 as indicated by Note (30-1).

TABLE 29

|  | Note |
|---|---|
| palette_coding( x0, y0, nCbS ) { | |
| ... | |
| if( CurrentPaletteSize != 0 && pps_palette_escape_flag) | (29-1) |
| palette_escape_val_present_flag | (29-2) |
| ... | |

TABLE 30

|  | Note |
|---|---|
| palette_coding( x0, y0, nCbS ) { | |
| ... | |
| if( CurrentPaletteSize != 0 && slice_palette_escape_flag) | (30-1) |
| palette_escape_val_present_flag | (30-2) |
| ... | |

In the above tables, palette_escape_val_present_flag equal to 1 specifies that the current coding unit contains at least one escape coded sample. escape_val_present_flag equal to 0 specifies that there are no escape coded samples in the current coding unit. When not present, the value of palette_escape_val_present_flag is inferred according to the following rules:

if slice_palette_escape_flag (or pps_palette_escape_flag) is equal to 0, palette_escape_val_present_flag is inferred to be equal to 0; and otherwise, palette_escape_val_present_flag is inferred to be equal to 1.

Embodiment 7: High Level Control of Redundancy Removal

According to this embodiment, multiple SPS, PPS and Slice header syntax elements are signaled to indicate whether redundancy removal is used or not in the coding of palette indices. An example incorporating this embodiment is shown below.

In one example of syntax table for sps_scc_extensions( ), SPS level palette redundancy removal control syntax sps_palette_redundancy_removal_control_flag can be 0, 1, 2, and 3. When sps_palette_redundancy_removal_control_flag is 0, the index redundancy removal is only applied to where the previous index run_type is the copy index mode. When sps_palette_redundancy_removal_control_flag is 1, the index redundancy removal is applied to where the previous index run type is the copy above mode. When sps_palette_redundancy_removal_control_flag is 2, the index redundancy removal is always used. When sps_palette_redundancy_removal_control_flag is 3, the index redundancy is not applied.

In another example, the sps_palette_redundancy_removal_control_flag can be 0, 1, and 2. When sps_palette_redundancy_removal_control_flag is 0, the index redundancy removal is only applied to where the previous index run_type is copy index mode. When sps_palette_redundancy_removal_control_flag is 1, the index redundancy removal is applied to where the previous index run type is copy above mode. When sps_palette_redundancy_removal_control_flag is 2, the index redundancy removal is always used.

In another example, the sps_palette_redundancy_removal_control_flag can be 0 and 1. When sps_palette_redundancy_removal_control_flag is 0, the index redundancy removal is only applied to those that the previous index run_type is a copy-index mode. When sps_palette_redundancy_removal_control_flag is 1, the index redundancy removal is always used Table 31 illustrates an exemplary syntax table for sps_scc_extensions( ), where sps_palette_redundancy_removal_control_flag is signaled as indicated by Note (31-2) if palette_mode_enabled_flag is equal to 1 as indicated by Note (31-1).

TABLE 31

|  | Note |
|---|---|
| sps_scc_extensions( ) {<br>    curr_pic_as_ref_enabled_flag<br>    palette_mode_enabled_flag<br>    if( palette_mode_enabled_flag ) {<br>        palette_max_size<br>        delta_palette_max_predictor_size<br>        sps_palette_redundancy_removal_control_flag<br>    }<br>} | (31-1)<br><br><br><br>(31-2) |

In an example of syntax table for pps_scc_extensions( ), PPS level palette redundancy removal control syntax pps_palette_redundancy_removal_control_flag can be 0, 1, 2, and 3. When pps_palette_redundancy_removal_control_flag is 0, the index redundancy removal is only applied to where the previous index run_type is copy index mode. When pps_palette_redundancy_removal_control_flag is 1, the index redundancy removal is applied to where the previous index run type is copy above mode. When pps_palette_redundancy_removal_control_flag is 2, the index redundancy removal is always used. When pps_palette_redundancy_removal_control_flag is 3, the index redundancy is not applied.

In another example, the pps_palette_redundancy_removal_control_flag can be 0, 1, and 2. When pps_palette_redundancy_removal_control_flag is 0, the index redundancy removal is only applied to where the previous index run_type is copy index mode. When pps_palette_redundancy_removal_control_flag is 1, the index redundancy removal is applied to where the previous index run type is copy above mode. When pps_palette_redundancy_removal_control_flag is 2, the index redundancy removal is always used.

In yet another example, the pps_palette_redundancy_removal_control_flag can be 0 and 1. When pps_palette_redundancy_removal_control_flag is 0, the index redundancy removal is only applied to where the previous index run_type is copy index mode. When pps_palette_redundancy_removal_control_flag is 1, the index redundancy removal is always used.

Table 32 illustrates an exemplary syntax table for pps_scc_extensions( ), where pps_palette_redundancy_removal_control_flag is signaled as indicated by Note (32-1).

TABLE 32

|  | Note |
|---|---|
| pps_scc_extensions( ) {<br>    pps_palette_redundancy_removal_control_flag<br>} | (32-1) |

In an example of syntax table for slice_segment_header( ) the slice level palette redundancy removal control syntax slice_palette_redundancy_removal_control_flag can be 0, 1, 2, and 3. When slice_palette_redundancy_removal_control_ flag is 0, the index redundancy removal is only applied to where the previous index run_type is copy index mode. When slice_palette_redundancy_removal_control_flag is 1, the index redundancy removal is applied to where the previous index run type is copy above mode. When slice_palette_redundancy_removal_control_flag is 2, the index redundancy removal is always used. When slice_palette_redundancy_removal_control_flag is 3, the index redundancy is not applied.

In another embodiment, the slice_palette_redundancy_removal_control_flag can be 0, 1, and 2. When slice_palette_redundancy_removal_control_flag is 0, the index redundancy removal is only applied to where the previous index run_type is copy index mode. When slice_palette_redundancy_removal_control_flag is 1, the index redundancy removal is applied to where the previous index run type is copy above mode. When slice_palette_redundancy_removal_control_flag is 2, the index redundancy removal is always used.

In another embodiment, the slice_palette_redundancy_removal_control_flag can be 0 and 1. When slice_palette_redundancy_removal_control_flag is 0, the index redundancy removal is only applied to where the previous index run_type is copy index mode. When slice_palette_redundancy_removal_control_flag is 1, the index redundancy removal is always used.

Table 33 illustrates an exemplary syntax table for pps_scc_extensions( ), where pps_palette_redundancy_removal_control_flag is signaled as indicated by Note (33-1).

TABLE 33

|  | Note |
|---|---|
| slice_segment_header( ) { | |
|     slice_palette_redundancy_removal_control_flag | (33-1) |
| } | |

Signaling Max Palette Table Size and Max Palette Predictor Size

In JCTVC-S1005, the maximum palette size and maximum palette predictor size are signaled at the SPS level using unsigned integer Exp-Golomb-coded syntax element with the left bit first when palette mode is enabled.

The palette table size for a given block (e.g. CU) is constrained by the maximum allowed palette size, and the related SPS syntax element is palette_max_size. The palette_max_size is binarized by Exp-Golomb Code. The size of palette predictor table is constrained by PaletteMaxPredictorSize so that the palette predictor size cannot exceed PaletteMaxPredictorSize. The related SPS syntax element delta_palette_max_predictor_size, specifies the difference between the maximum allowed palette predictor size (i.e., palette_max_size) and the maximum allowed palette size. The variable PaletteMaxPredictorSize is derived as follows:

PaletteMaxPredictorSize=palette_max_size+delta_palette_max_predictor_size

Table 34 illustrates an examle of the mapping between the bit string and codeNum value.

TABLE 34

| Bit string | codeNum |
|---|---|
| 1 | 0 |
| 0 1 0 | 1 |

TABLE 34-continued

| Bit string | codeNum |
|---|---|
| 0 1 1 | 2 |
| 0 0 1 0 0 | 3 |
| 0 0 1 0 1 | 4 |
| 0 0 1 1 0 | 5 |
| 0 0 1 1 1 | 6 |
| 0 0 0 1 0 0 0 | 7 |
| 0 0 0 1 0 0 1 | 8 |
| 0 0 0 1 0 1 0 | 9 |
| ... | ... |

Signaling Max Palette Size Using Logarithm to the Base 2

In one embodiment, the maximum palette size is signaled using logarithm to the base 2 with the syntax element is log2_palette_max_size. The maximum palette size is calculated by the following equation:

$$\text{max\_palette\_size} = (1 << \text{log2\_palette\_max\_size}) \quad (1)$$

In the above equation, max_palette_size is a variable that indicates the maximum palette size. Exemplary syntax table for SPS and Palette syntax according to this embodiment are shown in Table 35 and Table 36 respectively. In Table 35, log2_palette_max_size is signaled as indicated by Note (35-2) if palette_mode_enabled_flag is equal to 1 as indicated by Note (35-1). In Table 36, syntax log2_palette_max_size is used to determine the maximum palette size as indicated by Notes (36-1) and (36-2) according to equation (1).

TABLE 35

|  | Note |
|---|---|
| sps_scc_extension( ) { | |
|   ... | |
|   if( palette_mode_enabled_flag ) { | (35-1) |
|     log2_ max_palette_size | (35-2) |
|   ... | |
|   } | |
| } | |

TABLE 36

|  | Note |
|---|---|
| palette_coding( x0, y0, nCbS ) { | |
|   palettePredictionFinished = 0 | |
|   NumPredictedPaletteEntries = 0 | |
|   for( predictorEntryIdx = 0; predictorEntryIdx < PredictorPaletteSize && | (36-1) |
|     !palettePredictionFinished && NumPredictedPaletteEntries < | |
|     ( 1<< log2_max_palette_size ) ); predictorEntryIdx++ ) { | |
|     palette_predictor_run | |
|     if( palette_predictor_run != 1 ) { | |
|       if( palette_predictor_run > 1 ) | |
|         predictorEntryIdx += palette_predictor_run − 1 | |
|       PalettePredictorEntryReuseFlag[ predictorEntryIdx ] = 1 | |
|       NumPredictedPaletteEntries++ | |
|     } else | |
|       palettePredictionFinished = 1 | |
|   } | |
|   if( NumPredictedPaletteEntries < ( 1<< log2_max_palette_size) ) | (36-2) |
|     num_signalled_palette_entries | |
|   ... | |
| } | |

In another embodiment, the derived variable "max_palette_size" can be used directly to replace the operation (1<<log2_max_palette_size) in the palette syntax table.

In yet another embodiment, the maximum palette size logarithm to the base 2 minus N (i.e., log2_max_palette_size_minusN) is signaled, and the max palette size is calculated by the following equation:

$$\text{max\_palette\_size} = 1 << (\text{log2\_max\_palette\_size\_mimus}N + N) \quad (2)$$

In the above equation, N can be any non-negative integer values. In the above equation, max_palette_size is a variable to indicate the maximum palette size.

Exemplary changes in syntax table for SPS and Palette syntax are shown in Table 37 and Table 38 respectively. In Table 37, log2_palette_max_size_minusN is signaled as indicated by Note (37-2) if palette_mode_enabled_flag is equal to 1 as indicated by Note (37-1). In Table 38, syntax log2_palette_max_size_minusN is used to determine the maximum palette size as indicated by Notes (38-1) and (38-2) according to equation (2).

TABLE 37

| | Note |
|---|---|
| sps_scc_extension( ) { | |
| ... | |
| if( palette_mode_enabled_flag ) { | (37-1) |
|     log2_max_palette_size_minusN | (37-2) |
|   ... | |
| } | |
| } | |

TABLE 38

| | Note |
|---|---|
| palette_coding( x0, y0, nCbS ) { | |
|   palettePredictionFinished = 0 | |
|   NumPredictedPaletteEntries = 0 | |
|   for( predictorEntryIdx = 0; predictorEntryIdx < PredictorPaletteSize && | (38-1) |
|     !palettePredictionFinished && NumPredictedPaletteEntries < | |
|     ( 1<< ( log2_max_palette_size_minusN + N ) ) ); predictorEntryIdx++ ) { | |
|     palette_predictor_run | |
|     if( palette_predictor_run != 1 ) { | |
|       if( palette_predictor_run > 1 ) | |
|         predictorEntryIdx += palette_predictor_run − 1 | |
|       PalettePredictorEntryReuseFlag[ predictorEntryIdx ] = 1 | |
|       NumPredictedPaletteEntries++ | |
|     } else | |
|       palettePredictionFinished = 1 | |
|   } | |
|   if( NumPredictedPaletteEntries < ( 1<< ( log2_max_palette_size_minusN + N ) ) ) | (38-2) |
|     num_signaled_palette_entries | |
|   ... | |
| } | |

In another example, the derived variable "max_palette_size" can be used directly to replace the operation (1<< (log2_max_palette_size_minusN+N)) in the palette syntax table.

Signaling the Maximum Palette Predictor Size

According to this embodiment, the logarithm to the base 2 of the difference between the maximum palette size and the maximum palette predictor size is signaled. The max palette predictor size is calculated according to equation (3):

$$\text{PaletteMaxPredictorSize} = (1 << (\text{log2\_palette\_max\_size} + \text{log2\_delta\_palette\_max\_predictor\_size})) \quad (3)$$

In another embodiment, the difference between the maximum palette size and maximum palette predictor size in log2 format is signaled. The maximum palette predictor size (i.e., PaletteMaxPredictorSize) is calculated according to equation (4):

$$\text{PaletteMaxPredictorSize} = \text{max\_palette\_size} + (1 << \text{log2\_delta\_palette\_max\_predictor\_size}) \quad (4)$$

For example, for max_palette_size=64 and PaletteMaxPredictorSize=96 (i.e., 1.5×max_palette_size), the maximum palette predictor size can be signaled with log2_delta_palette_max_predictor_size=5 since 96=64+(1<<5) according to equation (4).

In yet another embodiment, the difference between the maximum palette size and the max palette predictor size in log2 minus N format is signaled. N can be any non-negative integer. The maximum palette predictor size (i.e., PaletteMaxPredictorSize) is calculated according to equation (5):

$$\text{PaletteMaxPredictorSize} = \text{max\_palette\_size} + (1 << \text{log2\_delta\_palette\_max\_predictor\_size\_minus}N + N) \quad (5)$$

For example, for N=3, max_palette_size=64 and PaletteMaxPredictorSize=96 (i.e., 1.5×max_palette_size) can be signaled with log2_delta_palette_max_predictor_size_minusN=2 since 96=64+(1<<(2+3)) according to equation (5).

In another embodiment, the logarithm to the base 2 of the maximum palette predictor size is signaled. The maximum palette predictor size is calculated according to equation (6):

$$\text{PaletteMaxPredictorSize} = (1 << \text{log2\_max\_palette\_predictor\_size}) \quad (6)$$

In another embodiment, the logarithm to the base 2 minus N for the maximum palette predictor size (i.e., log2_max_palette_predictor_size_minusN) is signaled. N can be any non-negative integer. The maximum palette predictor size is calculated according to equation (7):

$$\text{PaletteMaxPredictorSize} = (1 << (\text{log2\_max\_palette\_predictor\_size\_minus}N + N)) \quad (7)$$

In another embodiment, the maximum palette predictor size is a multiple of maximum palette size. The multiply factor is D. The maximum palette predictor size is calculated according to equation (8):

$$\text{PaletteMaxPredictorSize} = D * (\text{max\_palette\_size}) \quad (8)$$

In the above equation, max_palette_size can be signaled the maximum palette size signaling method disclosed above. D can be an integer or a fractional number. For example, D can be 1, 1.5, 2 or 2.5. D can be signaled or predefined.

When D is signaled, a mapping (e.g., a table) can used to indicate the D values and signal it with Exp-Golomb or fixed length code. Some examples of signaling D are shown in Tables 39a through 39e.

TABLE 39a

| Signalling | D |
|---|---|
| 0 | 1 |
| 1 | 1.5 |

TABLE 39b

| Signalling | D |
|---|---|
| 0 | 1.5 |
| 1 | 2 |

TABLE 39c

| Signalling | D |
|---|---|
| 0 | 1 |
| 10 | 1.5 |
| 11 | 2 |

TABLE 39d

| Signalling | D |
|---|---|
| 00 | 1 |
| 01 | 1.5 |
| 10 | 2 |
| 11 | 2.5 |

TABLE 39e

| Signalling | D |
|---|---|
| 0 | 2 |
| 10 | 1.5 |
| 110 | 1 |
| 111 | 2.5 |

Note that above are just some exemplary embodiments. Other embodiments, such as with different number of values, different values of D, different signaling binarization, can easily be constructed using the principle described in this invention.

Binarization of max_palette_size and PaletteMaxPredictorSize

In this embodiment, the syntax elements related to the maximum palette size (i.e., max_palette_size) and the maximum palette predictor size (i.e., PaletteMaxPredictorSize), such as log2_max_palette_size, log2_max_palette_size_mimusN, log2_delta_palette_max_predictor_size, log2_max_palette_predictor_size, log2_max_palette_predictor_size_minusN, and D can be binarized by $M^{th}$ order Exp-Golomb code, M is an integer greater than or equal to 0.

In another embodiment, the syntax elements mentioned the paragraph above can be binarized by the fixed length code. For example, 3-bit fixed length codes can be used for the table with the maximum syntax element of 8.

High Level Syntax for Monochrome Coding System

As mentioned before, the existing SPS and PPS syntax tables include some syntax elements related to luma and chroma components. However, there is only one color component in the monochrome coding system. In order to remove or reduce the redundancy associated with chroma syntax elements, various embodiments are disclosed.

Embodiment 1: Omitting Signaling the Chroma Syntax Related to Monochrome Content at SPS According to this embodiment, when the input video content is mono chrome, i.e., the chroma_format_idc=0, the chroma related syntax at SPS will not be signaled.

For example, the bit depth of the samples of the chroma component will not be signaled when the video data is monochrome. An exemplary syntax table is shown in Table 40, where chroma related syntax bit_depth_chroma_minus8 is added as indicated by Note (40-2) when the video data is not monochrome as indicated by Note (40-1).

TABLE 40

|  | Note |
|---|---|
| seq_parameter_set_rbsp( ) { | |
|   sps_video_parameter_set_id | |
|   sps_max_sub_layers_minus1 | |
|   sps_temporal_id_nesting_flag | |
|   profile_tier_level( 1, | |
|   sps_max_sub_layers_minus1 ) | |
|   sps_seq_parameter_set_id | |
|   chroma_format_idc | |
|   if( chroma_format_idc = = 3 ) | |
|     separate_colour_plane_flag | |
|   ... | |
|   bit_depth_luma_minus8 | |
|   if( chroma_format_idc != 0 ) | (40-1) |
|     bit_depth_chroma_minus8 | (40-2) |
|   sample_adaptive_offset_enabled_flag | |
|   ... | |
|   num_short_term_ref_pic_sets | |
| } | |

In another example, the bit depth of the PCM samples of the chroma component will not be signaled when the video data is monochrome. An example of the syntax table is shown in Table 41, where chroma related syntax pcm_sample_bit_depth_chroma_minus1 is added as indicated by Note (41-2) when the video data is not monochrome as indicated by Note (41-1).

TABLE 41

|  | Note |
|---|---|
| pcm_enabled_flag | |
| if( pcm_enabled_flag ) { | |
|   pcm_sample_bit_depth_luma_minus1 | |
|   if( chroma_format_idc != 0 ) | (41-1) |
|     pcm_sample_bit_depth_chroma_minus1 | (41-2) |
| } | |

Embodiment 2: Modifying the Decoding Process at SPS for Monochrome Content

According to this, the chroma related syntax at SPS will still be signaled, however, the decoding process will ignore the value of these syntax elements. For example, the bit depth of the samples of the chroma arrays BitDepth$_C$ will not be used and the syntax element related to chrome bit depth will not be used and will ignore the value. The semantics change is as below:

bit_depth_chroma_minus8 specifies the bit depth of the samples of the chroma arrays BitDepth$_C$ and the value of the chroma quantization parameter range offset QpBdOffset$_C$ as follows:

BitDepth$_C$=8+bit_depth_chroma_minus8, and

QpBdOffset$C$=6*bit_depth_chroma_minus8, where bit_depth_chroma_minus8 shall be in the range of 0 to 8, inclusive.

When ChromaArrayType is equal to 0, bit_depth_chroma_minus8 will not be used in the decoding process and decoders shall ignore its value.

Embodiment 3: Omitting Signaling the Syntax Related to Chroma for Mono Chrome Content at PPS, and Signaling a pps_monochrome_flag at PPS to Indicate the Video Content Format For example, pps_monochrome_flag can be signaled to indicate if the current content is monochrome or not. When the pps_monochrome_flag is equal to 1, it means that the current input content is monochrome. Otherwise, the current input content is not monochrome. It is the bitstream conformance requirement that when ChromaArrayType is equal to 0, the pps_monochrome_flag is 1. An exemplary syntax table is shown in Table 42, where pps_monochrome_flag is signaled in the PPS as indicated by Note (42-1).

TABLE 42

| | Note |
|---|---|
| pic_parameter_set_rbsp( ) { | |
| pps_pic_parameter_set_id | |
| pps_seq_parameter_set_id | |
| pps_monochrome_flag | (42-1) |
| ... | |
| } | |

In another example, when the current content is monochrome, the pps_cb_qp_offset is not signaled when the video data is monochrome. Also, when the current content is monochrome, the pps_cr_qp_offset is not signaled. Furthermore, when the current content is monochrome, the pps_slice_chroma_qp_offsets_present_flag is not signaled. An exemplary syntax table is shown in Table 43, where pps_cb_qp_offset, pps_cr_qp_offset and pps_slice_chroma_qp_offsets_present_flag are signaled in the PPS as indicated by Notes (43-2) to (43-4) if pps_monochrome_flag is 0 as indicated by Note (43-1).

TABLE 43

| | Note |
|---|---|
| pic_parameter_set_rbsp( ) { | |
| cu_qp_delta_enabled_flag | |
| if( cu_qp_delta_enabled_flag ) | |
| diff_cu_qp_delta_depth | |
| if( !pps_monochrome_flag){ | (43-1) |
| pps_cb_qp_offset | (43-2) |

TABLE 43-continued

| | Note |
|---|---|
| pps_cr_qp_offset | (43-3) |
| pps_slice_chroma_qp_offsets_present_flag | (43-4) |
| } | |
| } | |

In yet another example, when the current content is monochrome, the chroma_qp_offset_list_enabled_flag is not signaled when the video data is monochrome, and the chrome_qp_offset_list_enabled_flag is inferred to be 0. An exemplary syntax table is shown in Table 44, where chrome_qp_offset_list_enabled_flag is signaled in the PPS range extension as indicated by Note (44-2) if pps_monochrome_flag is 0 as indicated by Note (44-1).

TABLE 44

| | Note |
|---|---|
| pps_range_extension( ) { | |
| if( transform_skip_enabled_flag ) | |
| log2_max_transform_skip_block_size_minus2 | |
| cross_component_prediction_enabled_flag | |
| if( !pps_monochrome_flag) | (44-1) |
| chroma_qp_offset_list_enabled_flag | (44-2) |
| if( chroma_qp_offset_list_enabled_flag ) { | |
| diff_cu_chroma_qp_offset_depth | |
| chroma_qp_offset_list_len_minus1 | |
| for( i = 0; i <= chroma_qp_offset_list_len_minus1; i++ ) { | |
| cb_qp_offset_list[ i ] | |
| cr_qp_offset_list[ i ] | |
| } | |
| } | |
| log2_sao_offset_scale_luma | |
| log2_sao_offset_scale_chroma | |
| } | |

In yet another example, the chrome_qp_offset_list_enabled_flag, diff_cu_chroma_qp_offset_depth, chroma_qp_offset_list_len_minus1, cb_qp_offset_list[ ], and cr_qp_offset_list[ ] are not signaled when the video data is monochrome. In this case, the value will be ignored for monochrome content. An exemplary syntax table is shown in Table 45, where these chroma related syntax elements are signaled in the PPS as indicated by Notes (45-2) to (45-6) if pps_monochrome_flag is 0 as indicated by Note (45-1).

TABLE 45

| | Note |
|---|---|
| pps_range_extension( ) { | |
| if( transform_skip_enabled_flag ) | |
| log2_max_transform_skip_block_size_minus2 | |
| cross_component_prediction_enabled_flag | |
| if( !pps_monochrome_flag){ | (45-1) |
| chroma_qp_offset_list_enabled_flag | (45-2) |
| if( chroma_qp_offset_list_enabled_flag ) { | |
| diff_cu_chroma_qp_offset_depth | (45-3) |
| chroma_qp_offset_list_len_minus1 | (45-4) |
| for( i = 0; i <= chroma_qp_offset_list_len_minus1; i++ ) { | |
| cb_qp_offset_list[ i ] | (45-5) |
| cr_qp_offset_list[ i ] | (45-6) |
| } | |
| } | |
| } | |
| log2_sao_offset_scale_luma | |
| log2_sao_offset_scale_chroma | |
| } | |

In yet another example, the cross_component_prediction_enabled_flag will not be signaled and is inferred to be 0 when the video data is monochrome. An exemplary syntax table is shown in Table 46, where cross_component_prediction_enabled_flag is signaled in the PPS as indicated by Note (46-2) if pps_monochrome_flag is 0 as indicated by Note (46-1).

TABLE 46

|  | Note |
|---|---|
| pps_range_extension( ) { | |
|   if( transform_skip_enabled_flag ) | |
|     log2_max_transform_skip_block_size_minus2 | |
|   if( !pps_monochrome_flag) | (46-1) |
|     cross_component_prediction_enabled_flag | (46-2) |
|   ... | |
| } | |

In yet another example, cross_component_prediction_enabled_flag and chroma_qp_offset_list_enabled_flag will not be signaled when the video data is monochrome. They are all inferred to be equal to 0. An exemplary syntax table is shown in Table 47, where cross_component_prediction_enabled_flag and chroma_qp_offset_list_enabled_flag are signaled in the PPS as indicated by Notes (47-2) and (47-3) if pps_monochrome_flag is 0 as indicated by Note (47-1).

TABLE 47

|  | Note |
|---|---|
| pps_range_extension( ) { | |
|   if( transform_skip_enabled_flag ) | |
|     log2_max_transform_skip_block_size_minus2 | |
|   if( !pps_monochrome_flag){ | (47-1) |
|     cross_component_prediction_enabled_flag | (47-2) |
|     chroma_qp_offset_list_enabled_flag | (47-3) |
|   } | |
|   if( chroma_qp_offset_list_enabled_flag ) { | |
|     diff_cu_chroma_qp_offset_depth | |
|     chroma_qp_offset_list_len_minus1 | |
|     for( i = 0; i <= chroma_qp_offset_list_len_minus1; i++ ) { | |
|       cb_qp_offset_list[ i ] | |
|       cr_qp_offset_list[ i ] | |
|     } | |
|   } | |
|   log2_sao_offset_scale_luma | |
|   log2_sao_offset_scale_chroma | |
| } | |

In yet another example, cross_component_prediction_enabled_flag, chroma_qp_offset_list_enabled_flag, and other syntaxes related to chroma_qp_offset_list_enabled_flag will not be signaled when the video data is monochrome. An exemplary syntax table is shown in Table 48, where cross_component_prediction_enabled_flag, chroma_qp_offset_list_enabled_flag, and other syntaxes related to chroma_qp_offset_list_enabled_flag are signaled in the PPS as indicated by Notes (48-2) through (48-7) if pps_monochrome_flag is 0 as indicated by Note (48-1)

TABLE 48

|  | Note |
|---|---|
| pps_range_extension( ) { | |
|   if( transform_skip_enabled_flag ) | |
|     log2_max_transform_skip_block_size_minus2 | |
|   if( !pps_monochrome_flag){ | (48-1) |
|     cross_component_prediction_enabled_flag | (48-2) |

TABLE 48-continued

|  | Note |
|---|---|
|     chroma_qp_offset_list_enabled_flag | (48-3) |
|     if( chroma_qp_offset_list_enabled_flag ) { | |
|       diff_cu_chroma_qp_offset_depth | (48-4) |
|       chroma_qp_offset_list_len_minus1 | (48-5) |
|       for( i = 0; i <= chroma_qp_offset_list_len_minus1; i++ ) { | |
|         cb_qp_offset_list[ i ] | (48-6) |
|         cr_qp_offset_list[ i ] | (48-7) |
|       } | |
|     } | |
|   } | |
|   log2_sao_offset_scale_luma | |
|   log2_sao_offset_scale_chroma | |
| } | |

The PPS SCC extension syntax elements, residual_adaptive_colour_transform_enabled_flag, pps_slice_act_qp_offsets_present_flag, pps_act_y_qp_offset_plus5, pps_act_cb_qp_offset_plus5, pps_act_cr_qp_offset_plus3 are not signaled and inferred to be 0 when the video data is monochrome. The corresponding screen content coding PPS syntax can be changed as shown in exemplary Table 49. In Table 49, residual_adaptive_colour_transform_enabled_flag, pps_slice_act_qp_offsets_present_flag, pps_act_y_qp_offset_plus5, pps_act_cb_qp_offset_plus5, pps_act_cr_qp_offset_plus3 are signaled in the PPS SCC extension as indicated by Notes (49-2) through (49-6) if pps_monochrome_flag is 0 as indicated by Note (49-1).

TABLE 49

| pps_scc_extension( ) { | Note |
|---|---|
|   pps_curr_pic_ref_enabled_flag | |
|   if(!pps_monochrome_flag) { | (49-1) |
|     residual_adaptive_colour_transform_enabled_flag | (49-2) |
|     if( residual_adaptive_colour_transform_enabled_flag ) { | |
|       pps_slice_act_qp_offsets_present_flag | (49-3) |
|       pps_act_y_qp_offset_plus5 | (49-4) |
|       pps_act_cb_qp_offset_plus5 | (49-5) |
|       pps_act_cr_qp_offset_plus3 | (49-6) |
|     } | |
|   } | |
|   pps_palette_predictor_initializer_present_flag | |
|   if( pps_palette_predictor_initializer_present_flag ) { | |
|     monochrome_palette_flag | (49-7) |
|     luma_bit_depth_entry_minus8 | |
|     if( !pps_monochrome_flag ) | |
|       chroma_bit_depth_entry_minus8 | |
|     pps_num_palette_predictor_initializer_minus1 | |
|     numComps = pps_monochrome_flag ? 1 : 3 | |
|     for( comp = 0; comp < numComps; comp++ ) | |
|       for( i = 0; i <= pps_num_palette_predictor_initializer_minus1; i++ ) | |
|         pps_palette_predictor_initializers[ comp ][ i ] | |
|   } | |
| } | |

In the above syntax table, the monochrome_palette_flag have the same meaning of pps_monochrome_flag. Therefore it will not be signaled as indicated by Note (49-7).

In another example, when pps_monochrome_flag is true, the residual_adaptive_colour_transform_enabled_flag is not signaled and it is inferred to be equal to 0. Thus pps_slice_act_qp_offsets_present_flag, pps_acty_qp_offset_plus5, pps_act_cb_qp_offset_plus5, and pps_act_cr_qp_offset_plus3 are not signaled and inferred to be equal to 0. An exemplary syntax table is shown in Table 50, where the chroma related syntax elements are not signaled if pps_monochrome_flag is 0 as indicated by Note (50-1).

TABLE 50

| | Note |
|---|---|
| pps_scc_extension( ) {<br>  pps_curr_pic_ref_enabled_flag<br>  if(!pps_monochrome_flag)<br>    residual_adaptive_colour_transform_enabled_flag<br>  if( residual_adaptive_colour_transform_enabled_flag ) {<br>    pps_slice_act_qp_offsets_present_flag<br>    pps_act_y_qp_offset_plus5<br>    pps_act_cb_qp_offset_plus5<br>    pps_act_cr_qp_offset_plus3<br>  }<br>...<br>} | (50-1) |

Palette Initialization for Predictive Palette Coding

In SCM-4.0 a global palette predictor set is signaled in Picture Parameter Set (PPS). Instead of resetting the palette prediction state to 0, palette predictors derived from the PPS are used instead. The palette predictor information may include PredictorPaletteSize, PreviousPaletteSize and PredictorPaletteEntries.

In this invention, a method for palette initialization is disclosed, where the global palette predictors are derived from previous coded slices or pictures, instead of from the current slice or current picture. For example, when encoding or decoding a slice or a picture, a set of global palette predictors are generated by a certain method, such as the most frequent used palettes or based on the statistic of previous coded slices or pictures, or the palettes in the last palette predictor table.

In one embodiment, a flag in PPS can be signaled to use the derived palette predictors or signaling new palette predictors.

In another embodiment, the system may always use the derived palette predictors in PPS as the global palette predictor.

In the existing HEVC SCC development, the palette predictor is initialized at the beginning of each slice. A set of palette predictors is signaled at the PPS level so the first palette coded CU in each slice can use the palette initial predictor. In addition, a set of palette predictors are signaled at SPS level so that when the palette predictor at PPS level is not signaled (or not used), the initial palette predictors at the SPS level can be used.

In one aspect of this invention, several methods related to the Palette predictor initialization at PPS or SPS, and the DPB management are disclosed for the case that the current picture is a reference picture.

At the SPS level, the syntax table for the palette predictor initialization is shown in Table 51. Syntax element sps_palette_predictor_initializer_present_flag is signaled as indicated by Note (51-1). If the syntax element is equal to 1, the initial palette predictors are signaled in the SPS level.

TABLE 51

| | Note |
|---|---|
| sps_palette_predictor_initializer_present_flag<br>if( sps_palette_predictor_initializer_present_flag ) {<br>  sps_num_palette_predictor_initializer_minus1<br>  numComps = ( chroma_format_idc = = 0 ) ? 1 : 3<br>  for( comp = 0; comp < numComps; comp++ )<br>    for( i = 0; i <=<br>    sps_num_palette_predictor_initializer_minus1; i++ )<br>      sps_palette_predictor_initializers[ comp ][ i ]<br>} | (51-1) |

At the PPS level, the syntax table for the palette predictor initialization is shown in Table 52. Syntax element pps_palette_predictor_initializer_present_flag is signaled as indicated by Note (52-1). If the syntax element is equal to 1, the initial palette predictors are signaled in the SPS level.

TABLE 52

| | Note |
|---|---|
| pps_palette_predictor_initializer_present_flag<br>if( pps_palette_predictor_initializer_present_flag ) {<br>  monochrome_palette_flag<br>  luma_bit_depth_entry_minus8<br>  if( !monochrome_palette_flag )<br>    chroma_bit_depth_entry_minus8<br>  pps_num_palette_predictor_initializer_minus1<br>  numComps = monochrome_palette_flag ? 1 : 3<br>  for( comp = 0; comp < numComps; comp++ )<br>    for( i = 0; i <=<br>    pps_num_palette_predictor_initializer_minus1; i++ )<br>      pps_palette_predictor_initializers[ comp ][ i ]<br>} | (52-1) |

Embodiment 1: Range of Number of Signaled Palette Predictor Initialization Entries In one embodiment, the range of the number of Palette predictor initializer at either PPS or SPS is proposed. In one method, either of them could be from 0 to maximally allowed palette predictor size (i.e., PaletteMaxPredictorSize in current HEVC SCC), inclusively. In another embodiment, either of them could be from 1 to maximally allowed palette predictor size.

For example, both of the numbers at PPS and SPS are required to be larger than or equal to 1. SPS level syntax sps_num_palette_predictor_initializer_minus1 plus 1 specifies the number of entries in the sequence palette predictor initializer. It is a requirement of bitstream conformance that the value of sps_num_palette_predictor_initializer_minus1 plus 1 shall be less than or equal to PaletteMaxPredictorSize, and shall be larger than or equal to 1. The PPS level syntax pps_num_palette_predictor_initializer_minus1 plus 1 specifies the number of entries in the picture palette predictor initializer. It is a requirement of bitstream conformance that the value of pps_num_palette_predictor_initializer_minus1 plus 1 shall be less than or equal to PaletteMaxPredictorSize, and shall be larger than or equal to 1.

In another example, both of the numbers at PPS and SPS are required to be larger than or equal to 0. SPS level syntax sps_num_palette_predictor_initializer_minus1 plus 1 can be used to specify the number of entries in the sequence palette predictor initializer and sps_num_palette_predictor_initializer shall be larger than or equal to 0. PPS level syntax sps_num_palette_predictor_initializer_minus1 plus 1 can be used to specify the number of entries in the picture palette predictor initializer and pps_num_palette_predictor_initializer shall be larger than or equal to 0.

Embodiment 2: Default Value of Number of Signaled Palette Predictor Initialization Entries In this embodiment of the present invention, the default value of the number of palette predictor initializer at either PPS or SPS is disclosed for the case that the corresponding syntax is not present in the bitstream. For example, either of them can be set to 0 when not present. In another example, either of them can be set to 1 when not present.

In one example, both numbers at PPS and SPS are set by default to be 1. In other words, the default value of sps_num_palette_predictor_initializer_minus1 and pps_num_palette_predictor_initializer_minus1 are inferred to be 0 when not present. It is a requirement of bitstream conformance that the value of sps_num_palette_predictor_initializer_minus1 plus 1 and pps_num_palette_predictor_initializer_minus1 plus 1 shall be less than or equal to PaletteMaxPredictorSize.

In another example, both of the numbers at PPS and SPS are set by default to be 0. In other words, the default value of sps_num_palette_predictor_initializer and pps_num_palette_predictor_initializer are inferred to be 0 when not present. It is a requirement of bitstream conformance that the value of sps_num_palette_predictor_initializer and pps_num_palette_predictor_initializer shall be less than or equal to PaletteMaxPredictorSize.

Embodiment 3: Default Value and Range of Number of Signaled Palette Predictor Initialization Entries According to this embodiment, the default values and ranges of the numbers of signaled Palette predictor initializers mentioned above can be combined. For example, both of the numbers at PPS and SPS are set by default to be 1, and both of the numbers at PPS and SPS are required to be larger than or equal to 1. In another example, both of the numbers at PPS and SPS are set by default to be 0, and both of the numbers at PPS and SPS are required to be larger than or equal to 0.

For the case that the value of number of palette predictor initializer at SPS starts from 0, an exemplary SPS syntax table is shown in Table 53. In this table, the syntax element sps_num_palette_predictor_initializer is signaled as indicated by Note (53-2) if syntax flag sps_palette_predictor_initializer_present_flag is equal to 1 as indicated by Note (53-1). Syntax sps_num_palette_predictor_initializer has a default value such as 0, when not present. On the other hand, the text with line-filled background indicates deleted text since the old syntax sps_num_palette_predictor_initializer_minus1 as indicated by Note (53-3) is not need due to the new syntax sps_num_palette_predictor_initializer.

TABLE 53

| sps_scc_extension( ) { | Note |
|---|---|
|   sps_curr_pic_ref_enabled_flag | |
|   palette_mode_enabled_flag | |
|   if( palette_mode_enabled_flag ) { | |
|     palette_max_size | |
|     delta_palette_max_predictor_size | |
|     sps_palette_predictor_initializer_present_flag | |
|     if( sps_palette_predictor_initializer_present_flag ) | (53-1) |
|       sps_num_palette_predictor_initializer | (53-2) |
|     if( sps_num_palette_predictor_initializer > 0 ) { | |
|       ~~sps_num_palette_predictor_initializer_minus1~~ | (53-3) |
|       numComps = (chroma_format_idc == 0 ) ? 1 : 3 | |
|       for( comp = 0; comp < numComps; comp++ ) | |
|         for( i = 0; i < | |
|         sps_num_palette_predictor_initializer; i++) | |
|           sps_palette_predictor_initializers[ comp ][ i ] | |
|     } | |
|   } | |
|   ... | |
| } | |

Table 54 illustrates another example of SPS syntax table similar to Table 53. In this table, the "if(sps_palette_predictor_initializer_present_flag)" loop in Note (54-1) covers statement from Note (54-2) to Note (54-3). The syntax element sps_num_palette_predictor_initializer may not have a default value, when not present.

TABLE 54

| sps_scc_extension( ) { | Note |
|---|---|
|   sps_curr_pic_ref_enabled_flag | |
|   palette_mode_enabled_flag | |
|   if( palette_mode_enabled_flag ) { | |
|     palette_max_size | |
|     delta_palette_max_predictor_size | |
|     sps_palette_predictor_initializer_present_flag | |
|     if( sps_palette_predictor_initializer_present_flag ) { | (54-1) |
|       sps_num_palette_predictor_initializer | (54-2) |
|       if( sps_num_palette_predictor_initializer > 0 ) { | |
|         numComps = (chroma_format_idc == 0 ) ? 1 : 3 | |
|         for( comp = 0; comp < numComps; comp++ ) | |
|           for( i = 0; | |
|           i <= sps_num_palette_predictor_initializer; i++ ) | |
|             sps_palette_predictor_initializers[ comp ][ i ] | |
|       } | |
|     } | (54-3) |
|   } | |
|   ... | |
| } | |

For the case that the value of number of palette predictor initializer at PPS starts from 0, an exemplary PPS syntax table is shown in Table 55. In this table, the syntax element pps_num_palette_predictor_initializer is signaled as indicated by Note (55-2) if syntax flag pps_palette_predictor_initializer_present_flag is equal to 1 as indicated by Note (55-1). Furthermore, if pps_num_palette_predictor_initializer is larger than 0 as indicated by Note (55-3), the syntax is used to signal pps_palette_predictor_initializers[ ][ ] as indicated by Note (55-5) according to pps_num_palette_predictor_initializer as indicated by Note (55-4). Syntax pps_num_palette_predictor_initializer has a default value such as 0, when not present.

TABLE 55

| | Note |
|---|---|
| pps_palette_predictor_initializer_present_flag | |
| if( pps_palette_predictor_initializer_present_flag ) | (55-1) |
|   pps_num_palette_predictor_initializer | (55-2) |
|   if( pps_num_palette_predictor_initializer > 0 ) { | (55-3) |
|     monochrome_palette_flag | |
|     luma_bit_depth_entry_minus8 | |
|     if( !monochrome_palette_flag ) | |
|       chroma_bit_depth_entry_minus8 | |
|     numComps = monochrome_palette_flag ? 1 : 3 | |
|     for( comp = 0; comp < numComps; comp++ ) | |
|       for( i = 0; i < pps_num_palette_predictor_initializer; | |
|       i++ ) | (55-4) |
|         pps_palette_predictor_initializers[ comp ][ i ] | (55-5) |
| } | |

In embodiments 1 to 3 mentioned above, when the number of Palette predictor initializer at either SPS or PPS is set to be 0, the corresponding decoding process for initializing the Palette predictor will be: no Palette predictor is generated (or the predictor Palette is with a size 0).

Figure 12:
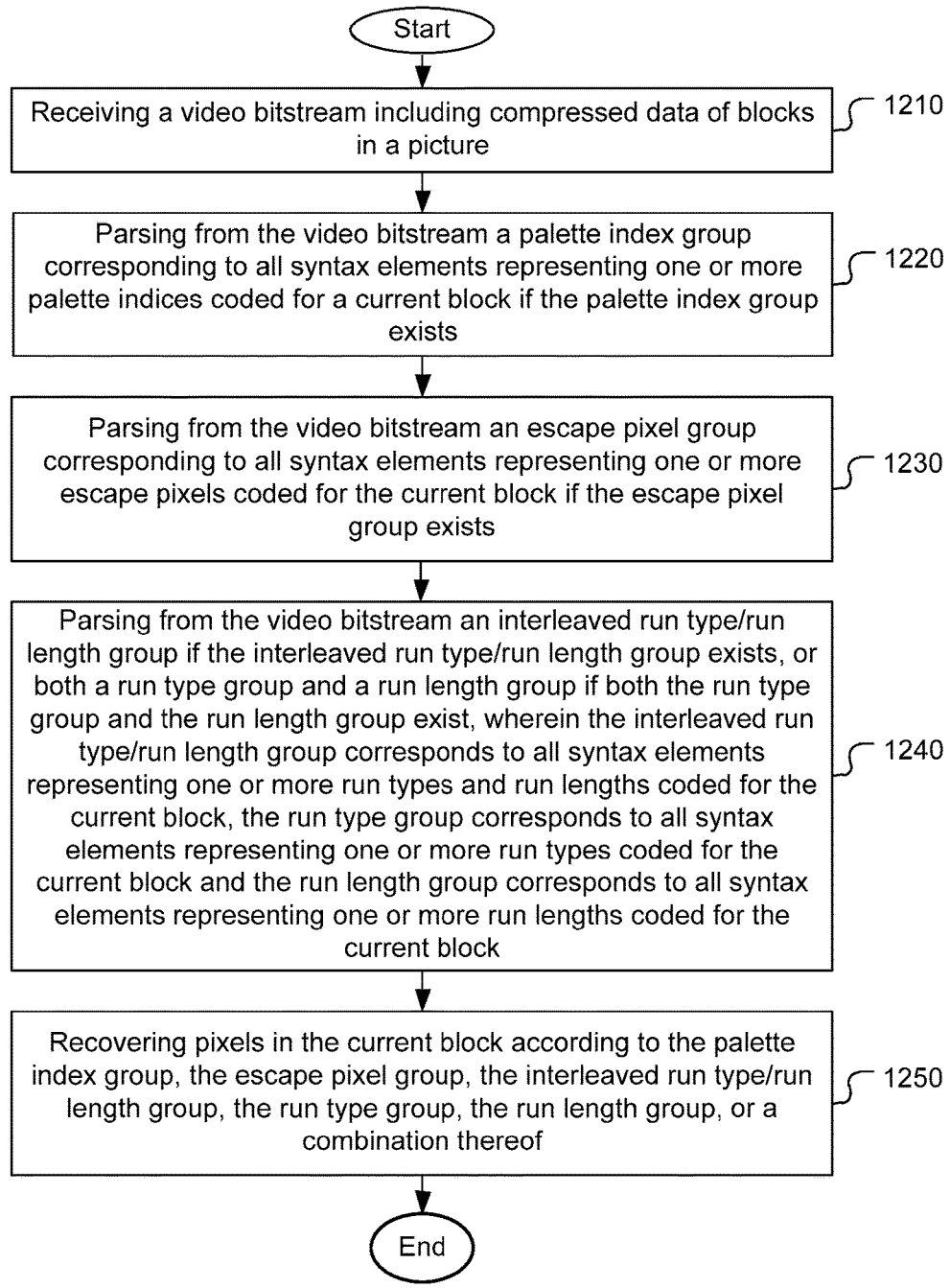
FIG. 12 illustrates an exemplary flowchart of a video decoder for palette index map coding by grouping coded symbols of the same type according to an embodiment of the present invention.

FIG. 12 illustrates an exemplary flowchart of a video decoder for palette index map coding by grouping coded symbols of the same type according to an embodiment of the present invention. The system receives a video bitstream including compressed data of blocks in a picture as shown in step 1210. The system parses a palette index group corresponding to all syntax elements representing one or more palette indices coded for a current block from the video bitstream if the palette index group exists in step 1220. The system parses an escape pixel group corresponding to all syntax elements representing one or more escape pixels coded for the current block from the video bitstream if the escape pixel group exists in step 1230. The system parses an interleaved run type/run length group from the video bitstream if the interleaved run type/run length group exists, or parses both a run type group and a run length group from the video bitstream if both the run type group and the run length group exist in step 1240, wherein the interleaved run type/run length group corresponds to all syntax elements representing one or more run types and run lengths coded for the current block, the run type group corresponds to all syntax elements representing one or more run types coded for the current block and the run length group corresponds to all syntax elements representing one or more run lengths coded for the current block. The system recovers pixels in the current block according to the palette index group, the escape pixel group, the interleaved run type/run length group, the run type group, the run length group, or a combination thereof as shown in step 1250.

Figure 13:
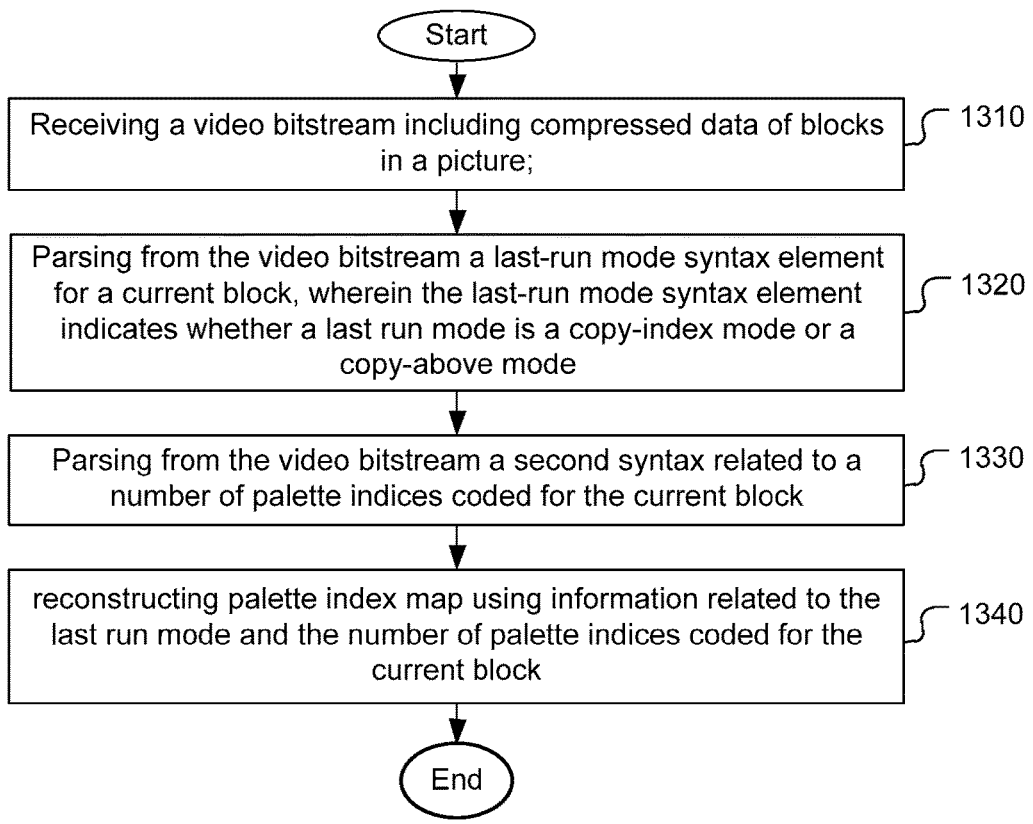
FIG. 13 illustrates an exemplary flowchart of a video decoder for palette index map coding by signaling a last-run mode syntax element according to an embodiment of the present invention.

FIG. 13 illustrates an exemplary flowchart of a video decoder for palette index map coding by signaling a last-run mode syntax element according to an embodiment of the present invention. The system receives a video bitstream including compressed data of blocks in a picture as shown in step 1310. The system parses from the video bitstream a last-run mode syntax element for a current block in step 1320, where the last-run mode syntax element indicates whether a last run mode is a copy-index mode or a copy-above mode. The system also parses from from the video bitstream a second syntax related to a number of palette indices coded for the current block as shown in step 1330. The system reconstructs palette index map using information related to the last run mode and the number of palette indices coded for the current block as shown in step 1340.

The flowcharts shown are intended to illustrate an example of palette index mapcoding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of palette index map decoding for blocks in a picture, the method comprising:
   receiving a video bitstream including compressed data of blocks in a picture;
   parsing from the video bitstream a palette index group corresponding to all syntax elements representing one or more palette indices coded for a current block if the palette index group exists;
   parsing from the video bitstream an escape pixel group corresponding to all syntax elements representing one or more escape pixels coded for the current block if the escape pixel group exists;
   parsing from the video bitstream an interleaved run type/run length group if the interleaved run type/run length group exists, or both a run type group and a run length group if both the run type group and the run length group exist, wherein the interleaved run type/run length group corresponds to all syntax elements representing one or more run types and run lengths coded for the current block, the run type group corresponds to all syntax elements representing one or more run types coded for the current block and the run length group corresponds to all syntax elements representing one or more run lengths coded for the current block; and
   recovering pixels in the current block according to the palette index group, the escape pixel group, the interleaved run type/run length group, the run type group, the run length group, or a combination thereof.

2. The method of claim 1, wherein both the run type group and the run length group are parsed from the video bitstream, and a signaling order of groups from an earliest group to a latest group in the video bitstream corresponds to the run type group, the palette index group, the run length group, and the escape pixel group.

3. The method of claim 1, wherein both the run type group and the run length group are parsed from the video bitstream, and a signaling order of groups from an earliest group to a latest group in the video bitstream corresponds to the palette index group, the run type group, the run length group, and the escape pixel group.

4. The method of claim 1, wherein the run length group is further divided into a context bin group and a bypass bin group, and the context bin group is signaled before bypass bin group.

5. The method of claim 1, wherein both the run type group and the run length group are parsed from the video bitstream, and a signaling order of groups from an earliest group to a latest group in the video bitstream corresponds to the run type group, the run length group, the palette index group, and the escape pixel group.

6. The method of claim 1, wherein the interleaved run type/run length group is parsed from the video bitstream, and a signaling order of groups from an earliest group to a latest group in the video bitstream corresponds to the interleaved run type/run length group, the palette index group, and the escape pixel group.

7. The method of claim 1, wherein both the run type group and the run length group are parsed from the video bitstream, and a signaling order of groups from an earliest group to a latest group in the video bitstream corresponds to the palette index group, the escape pixel group, the run type group and the run length group.

8. The method of claim 1, wherein both the run type group and the run length group are parsed from the video bitstream, and a signaling order of groups from an earliest group to a latest group in the video bitstream corresponds to the palette index group, the escape pixel group, the run group length and the run type group.

9. The method of claim 1, wherein the interleaved run type/run length group is parsed from the video bitstream, and a signaling order of groups from an earliest group to a latest group in the video bitstream corresponds to the palette index group, the escape pixel group, and the interleaved run type/run length group.

10. The method of claim 1, wherein both the run type group and the run length group are parsed from the video bitstream, and a signaling order of groups from an earliest group to a latest group in the video bitstream corresponds to the escape pixel group, the palette index group, the run type group and the run length group.

11. The method of claim 1, wherein both the run type group and the run length group are parsed from the video bitstream, and a signaling order of groups from an earliest group to a latest group in the video bitstream corresponds to the escape pixel group, the palette index group, the run group length and the run type group.

12. The method of claim 1, wherein the interleaved run type/run length group is parsed from the video bitstream, and a signaling order of groups from an earliest group to a latest group in the video bitstream corresponds to the escape pixel group, the palette index group, and the interleaved run type/run length group.

13. A method of palette index map decoding for blocks in a picture, the method comprising:
receiving a video bitstream including compressed data of the blocks in the picture;
parsing from the video bitstream a last-run mode syntax element for a current block, wherein the last-run mode syntax element indicates whether a last run mode is a copy-index mode or a copy-above mode;
parsing from the video bitstream a second syntax related to a number of palette indices coded for the current block; and
reconstructing palette index map using information related to the last run mode and the number of palette indices coded for the current block.

14. The method of claim 13, wherein if the last-run mode syntax element indicates the last run mode being the copy-index mode and when a last signaled palette index is reached, any remaining palette index to be decoded is copied from the last signaled palette index.

15. The method of claim 13, wherein if the last-run mode syntax element indicates the last run mode being the copy-above mode, one or more run lengths coded for the current block are parsed from the video bitstream and a copy-above mode syntax element is inserted as the last run mode.

16. The method of claim 13, further comprising:
parsing from the video bitstream a palette index group corresponding to all syntax elements representing one or more palette indices coded for the current block if the palette index group exists;
parsing from the video bitstream an escape pixel group corresponding to all syntax elements representing one or more escape pixels coded for the current block if the escape pixel group exists; and
parsing from the video bitstream an interleaved run type/run length group if the interleaved run type/run length group exists, or both a run type group and a run length group if both the run type group and the run length group exist, wherein the interleaved run type/run length group corresponds to all syntax elements representing one or more run types and run lengths coded for the current block, the run type group corresponds to all syntax elements representing one or more run types coded for the current block and the run length group corresponds to all syntax elements representing one or more run lengths coded for the current block.

17. A method of palette index map coding for blocks in a picture, the method comprising:
receiving input data associated with a current block in the picture;
applying palette coding to the current block to generate coded symbols for the current block using palette coding modes, wherein the palette coding modes include run type modes comprising a copy-index mode and a copy-above mode;
signaling syntax elements for the coded symbols by grouping all syntax elements corresponding to the copy-index mode and the copy-above mode into a run type group; and
signaling a last-run mode syntax element to indicate whether a last run type mode is the copy-index mode or the copy-above mode.

18. The method of claim 17, wherein if multiple same copy-index modes exist at an end of to-be-signaled palette indices, only one of the multiple same copy-index modes is signaled and the last-run mode syntax element is assigned a value to indicate the copy-index mode.

19. The method of claim 17, wherein if the last run type mode is the copy-above mode, the last-run mode syntax element is inferred to be a value to indicate the last run type mode being the copy-above mod and a last copy-above run is not signaled but inferred to end of the current block.

20. The method of claim 17, further comprising:
grouping all syntax elements corresponding to a pixel index into a pixel index group if any coded symbol corresponding to a pixel index exists;

grouping all syntax elements corresponding to a escape pixel into an escape pixel group if any coded symbol corresponding to the escape pixel exists; and grouping all syntax elements corresponding to a run type and run length into an interleaved run type/run length group, or grouping all syntax elements corresponding to the run type into a run type group and all syntax elements corresponding to the run length into a run length group if any coded symbol corresponding to the run type exists.

* * * * *